US012695025B2

(12) United States Patent
Tamashiro et al.

(10) Patent No.: US 12,695,025 B2
(45) Date of Patent: Jul. 28, 2026

(54) REACTOR

(71) Applicant: TOKIN CORPORATION, Shiroishi (JP)

(72) Inventors: Katsuaki Tamashiro, Sendai (JP); Yuji Nitobe, Sendai (JP); Masahiro Kondo, Sendai (JP); Norimitsu Hoshi, Sendai (JP); Hideaki Hayasaka, Sendai (JP)

(73) Assignee: TOKIN CORPORATION, Miyagi (JP)

(*) Notice: Subject to any disclaimer, the term of this patent is extended or adjusted under 35 U.S.C. 154(b) by 690 days.

(21) Appl. No.: 18/032,352

(22) PCT Filed: Sep. 1, 2021

(86) PCT No.: PCT/JP2021/032195
§ 371 (c)(1),
(2) Date: Apr. 18, 2023

(87) PCT Pub. No.: WO2022/085311
PCT Pub. Date: Apr. 28, 2022

(65) Prior Publication Data
US 2023/0386734 A1 Nov. 30, 2023

(30) Foreign Application Priority Data
Oct. 23, 2020 (JP) ................................ 2020-177981

(51) Int. Cl.
*H01F 27/24* (2006.01)
*H01F 1/24* (2006.01)
(Continued)

(52) U.S. Cl.
CPC ............ *H01F 27/306* (2013.01); *H01F 1/24* (2013.01); *H01F 3/10* (2013.01); *H01F 27/255* (2013.01)

(58) Field of Classification Search
CPC .................................................... H01F 27/306
(Continued)

(56) References Cited

U.S. PATENT DOCUMENTS 7,446,640 B2 * 11/2008 Saito .................... H01F 27/326
336/212
11,495,386 B2 11/2022 Nanbara et al.
(Continued)

FOREIGN PATENT DOCUMENTS

JP 2013143454 A 7/2013
JP 2015050397 A 3/2015
(Continued)

OTHER PUBLICATIONS

Extended European Search Report (EESR) dated Jul. 1, 2024, issued in counterpart European Application No. 21882452.2.
(Continued)

*Primary Examiner* — Ronald Hinson
(74) *Attorney, Agent, or Firm* — Holtz, Holtz & Volek PC

(57) ABSTRACT

A reactor includes a coil having a winding part, a holding member, and a magnetic core. The winding part is partially buried inside the holding member, and has an upper exposed part and a lower exposed part exposed from the holding member in the vertical direction (Z direction). The upper exposed part has an upper curved surface part. The upper curved surface part is exposed from the holding member at both sides in the horizontal direction (Y direction). The magnetic core has two outer legs. The winding part is positioned between the two outer legs in the horizontal direction. The holding member has two side walls corresponding to each of the outer legs. Each of the side walls is positioned between the corresponding outer leg and the winding part in the horizontal direction.

16 Claims, 8 Drawing Sheets

(51) Int. Cl.
*H01F 3/10* (2006.01)
*H01F 27/255* (2006.01)
*H01F 27/30* (2006.01)

(58) Field of Classification Search
USPC .................................................. 336/198, 221
See application file for complete search history.

(56) References Cited

U.S. PATENT DOCUMENTS

| | | | | |
|---|---|---|---|---|
| 11,735,351 | B2 * | 8/2023 | Takeuchi | H01F 41/0246 336/220 |
| 2002/0097131 | A1 * | 7/2002 | Kondo | H01F 37/00 336/212 |
| 2007/0035374 | A1 * | 2/2007 | Watanabe | H01F 27/326 336/208 |
| 2009/0230869 | A1 * | 9/2009 | Suzuki | H01F 27/326 336/213 |
| 2009/0237196 | A1 * | 9/2009 | Watanabe | H01F 27/306 336/212 |
| 2012/0139684 | A1 * | 6/2012 | Kobayashi | H01F 27/306 336/92 |
| 2014/0125440 | A1 * | 5/2014 | Ueno | H01F 27/06 336/65 |
| 2014/0218158 | A1 * | 8/2014 | Miyamoto | H01F 37/00 336/198 |
| 2014/0293655 | A1 * | 10/2014 | Inaba | H01F 3/08 336/90 |
| 2020/0312499 | A1 | 10/2020 | Kumaoka et al. | |
| 2023/0307169 | A1 * | 9/2023 | Yoshikawa | H01F 27/24 |

FOREIGN PATENT DOCUMENTS

| | | | |
|---|---|---|---|
| JP | 2018190910 | A | 11/2018 |
| JP | 2019134127 | A | 8/2019 |
| JP | 2019165061 | A | 9/2019 |
| JP | 6593780 | B2 | 10/2019 |
| JP | 2020053461 | A | 4/2020 |
| JP | 2020096025 | A | 6/2020 |
| JP | 2020102538 | A | 7/2020 |
| JP | 2020158831 | A | 10/2020 |

OTHER PUBLICATIONS

Japanese Office Action (and an English language translation thereof) dated Jul. 24, 2024, issued in counterpart Japanese Application No. 2020-177981.

International Search Report (ISR) (and an English language translation thereof) dated Nov. 2, 2021, issued in International Application No. PCT/JP2021/032195.

Written Opinion dated Nov. 2, 2021, issued in International Application No. PCT/JP2021/032195.

* cited by examiner

REACTOR

TECHNICAL FIELD

This invention relates to a reactor comprising a coil which is partially embedded in a holding member.

BACKGROUND ART

For example, this type of reactor is disclosed in Patent Document 1.

Patent Document 1 discloses a reactor comprising a coil, an integration resin (holding member) and a magnetic core. The coil is partially embedded in the holding member and is thereby held by the holding member. The coil is a so-called eyeglass coil. In detail, the coil has two winding portions coupled together. Each of the winding portions is wound about a passing hole (center hole) and is partially embedded in the holding member. The two center holes of the coil extend in parallel to each other. The magnetic core has a single ring shape and passes through the two center holes.

PRIOR ART DOCUMENTS

Patent Document(s)

Patent Document 1: JPB 6593780

SUMMARY OF INVENTION

Technical Problem

By partially embedding the winding portion of the coil in the holding member as disclosed in Patent Document 1, the turns of the winding portion can be prevented from becoming loose. However, the magnetic core of Patent Document 1 has a shape like a UU-core as a whole. When a reactor is formed of an eyeglass coil and a magnetic core having a shape like a UU-core, its magnetic path length tends to be long, and a cross-section of its magnetic path tends to be small. Thus, according to the structure of Patent Document 1, it is difficult to make inductance large.

It is therefore an object of the present invention to provide a reactor which comprises a coil partially embedded in a holding member and has a relatively large inductance.

Solution to Problem

The inductance of a reactor will be made large by using a coil having a single winding portion and a magnetic core having a shape like an EE-core. More specifically, the coil of this reactor has a single center hole extending along a front-rear direction. The winding portion of the coil is wound about the center hole. The magnetic core has a middle leg and two outer portions. The middle leg passes through the center hole of the coil. The two outer portions sandwich the winding portion in a lateral direction perpendicular to the front-rear direction and are connected to the middle leg. Thus, the magnetic core has s shape like an EE-core in a horizontal plane defined by the front-rear direction and the lateral direction. According to this structure, the magnetic path length can be made short, and the cross-section of the magnetic path can be made large. Thus, the inductance of the reactor can be made large.

It may seem possible to easily form the reactor having the aforementioned structure. However, according to this reactor, the outer portions of the magnetic core are arranged so that they face side surfaces of the winding portion in the lateral direction. If the side surfaces of the winding portion were exposed toward the outer portions of the magnetic core, insulation properties between the side surface of the winding portion and the outer portion of the magnetic core might be lowered under a condition where the side surface of the winding portion was damaged, for example. Therefore, the holding member should completely cover the side surfaces of the winding portion which face the outer portions of the magnetic core and insulate them from the outer portions. Thus, the holding member should be molded so that the side surfaces of the winding portion are embedded in the holding member.

However, when the holding member is molded as described above, the coil should be held so that it is unmovable in the horizontal plane in addition to the upper-lower direction. More specifically, the side surfaces of the coil should be pressed and held by a die. As a result of the holding by the die, a trace of the die is inevitably formed on a side portion of the holding member in which the coil is embedded. More specifically, the side portion of the holding member is formed with a part at which the side surface of the winding portion is exposed toward the outer portion of the magnetic core.

As can be seen from the explanation described above, it is difficult to provide a magnetic core having a shape like an EE-core in a reactor comprising a coil partially embedded in a holding member. The inventors of the present invention have invented a new structure of a holding member provided with a coil embedded therein as a result of their research to solve this problem. According to this new structure, a magnetic core having a shape like an EE-core can be provided in a reactor comprising a coil partially embedded in a holding member. Specifically, the invention provides the reactor described below.

An aspect of the present invention provides a reactor comprising a coil, a holding member and a magnetic core. The coil has a winding portion. The winding portion is wound about a single center axis which extends along a front-rear direction. The winding portion has an upper exposed portion and a lower exposed portion. The upper exposed portion and the lower exposed portion are located at opposite sides, respectively, in an upper-lower direction perpendicular to the front-rear direction. The winding portion is partially embedded in the holding member. Each of the upper exposed portion and the lower exposed portion is exposed from the holding member in the upper-lower direction. The upper exposed portion has an upper curved portion. The upper curved portion is exposed from the holding member at opposite sides thereof in a lateral direction perpendicular to both the front-rear direction and the upper-lower direction. The magnetic core has a middle leg and two outer portions. Each of the outer portions has an outer leg and two coupling portions. The middle leg is enclosed by the winding portion in a vertical plane perpendicular to the front-rear direction. The winding portion is located between the two outer legs in the lateral direction. For each of the outer portions, the coupling portions couple opposite ends of the outer leg in the front-rear direction to opposite ends of the middle leg in the front-rear direction, respectively. The holding member has two sidewalls which correspond to the outer legs, respectively. Each of the sidewalls is located between a corresponding one of the outer legs and the winding portion in the lateral direction.

Another aspect of the present invention provides a reactor comprising a coil, a holding member and a magnetic core. The coil has a winding portion. The winding portion is wound about a single center axis which extends along a front-rear direction. The winding portion is partially embedded in the holding member. The magnetic core is a gapless core. The magnetic core has a middle leg and two outer portions. Each of the outer portions has an outer leg and two coupling portions. The middle leg is enclosed by the winding portion in a vertical plane perpendicular to the front-rear direction. The winding portion is located between the two outer legs in a lateral direction perpendicular to the front-rear direction. For each of the outer portions, the coupling portions couple opposite ends of the outer leg in the front-rear direction to opposite ends of the middle leg in the front-rear direction, respectively. The holding member has an upper front support portion, an upper rear support portion and an outer wall. The upper front support portion is located forward of the winding portion and is in contact with an upper surface of the magnetic core in an upper-lower direction perpendicular to both the front-rear direction and the lateral direction. The upper rear support portion is located rearward of the winding portion and is in contact with an upper surface of the magnetic core. The outer wall is in contact with an external surface of the magnetic core in a horizontal plane perpendicular to the upper-lower direction. The holding member is provided with a fastening portion for fastening the reactor on an object. The fastening portion is integrally formed with the holding member.

Advantageous Effects of Invention

According to an aspect of the present invention, the upper exposed portion of the winding portion is exposed upward from the holding member, and the lower exposed portion of the winding portion is exposed downward from the holding member. As can be seen from this structure, when the holding member is molded, the upper exposed portion and the lower exposed portion can be vertically sandwiched by a die. Moreover, the upper curved portion is exposed outward in the lateral direction. As can be seen from this structure, when the holding member is molded, the upper curved portion can be sandwiched by a die in the lateral direction and thereby can be held so that it is unmovable in the horizontal plane. Thus, the holding member of an aspect of the present invention can be formed so that the winding portion is partially embedded therein.

According to an aspect of the present invention, the sidewalls of the holding member are located between the winding portion and the outer legs in the lateral direction, respectively, and insulate the winding portion from the magnetic core. Therefore, the magnetic core having a shape like an EE-core can be provided in the reactor comprising the coil partially embedded in the holding member.

As described above, the reactor of an aspect of the present invention can be made of the coil having the single winding portion and the magnetic core having a shape like an EE-core. Thus, an aspect of the present invention can provide a reactor which comprises a coil partially embedded in a holding member and has a relatively large inductance.

An appreciation of the objectives of the present invention and a more complete understanding of its structure may be had by studying the following description of the preferred embodiment.

DESCRIPTION OF EMBODIMENTS

Figure 1:
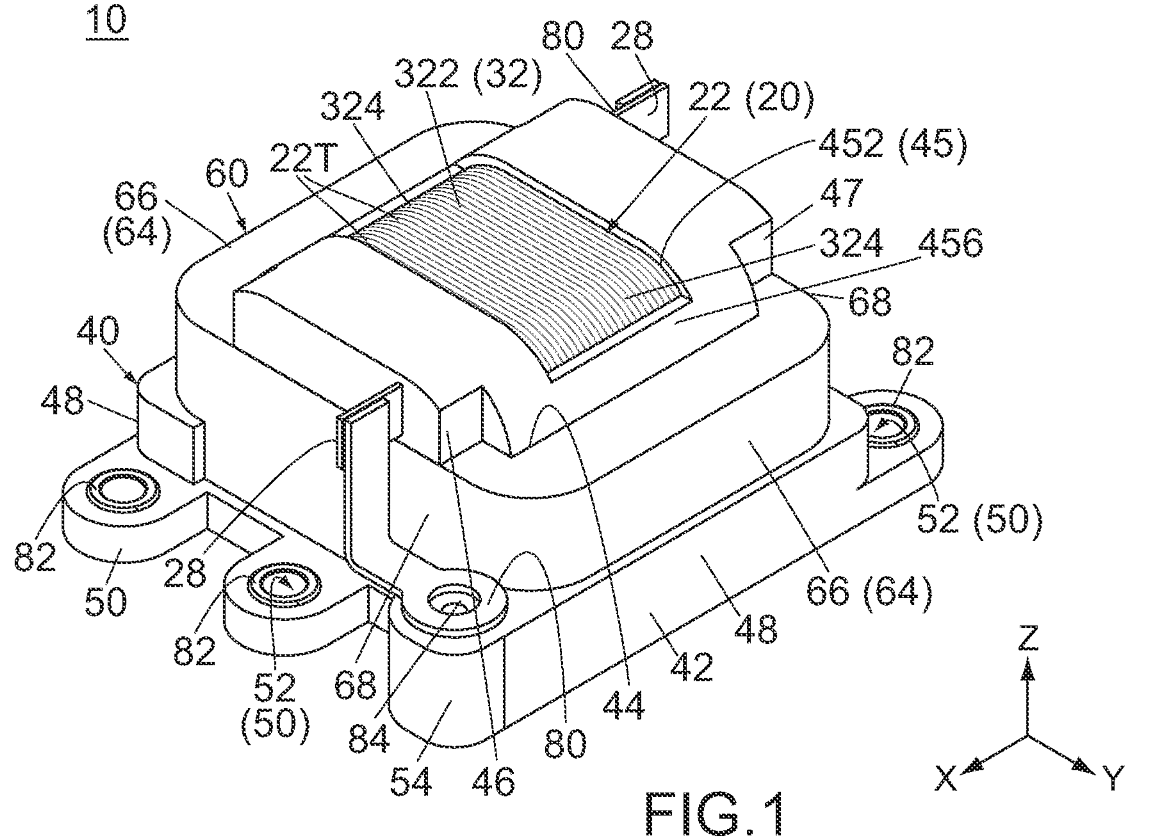
FIG. 1 is a perspective view showing a reactor according to an embodiment of the present invention together with busbars, wherein nuts are attached to the reactor.

Referring to FIG. 1, a reactor 10 of an embodiment of the present invention is a single-phase reactor of a booster (not shown). For example, the reactor 10 is used for boosting current which is supplied to a motor (not shown) of an electric vehicle (EV). Thus, the reactor 10 is arranged in a relatively small space and is used under a high vibration environment. However, the present invention is not limited thereto but is applicable to various reactors.

The reactor 10 of the present embodiment comprises a coil 20, a holding member 40 made of insulator, four fastening portions 50 each made of insulator and a magnetic core 60 made of soft magnetic material. The fastening portions 50 are attached to the holding member 40. The reactor 10 of the present embodiment comprises only the aforementioned members, consisting of the coil 20, the holding member 40, the fastening portions 50 and the magnetic core 60. However, the present invention is not limited thereto. For example, the reactor 10 may further comprise a case (not shown) which is configured to accommodate the aforementioned members.

Figure 6:
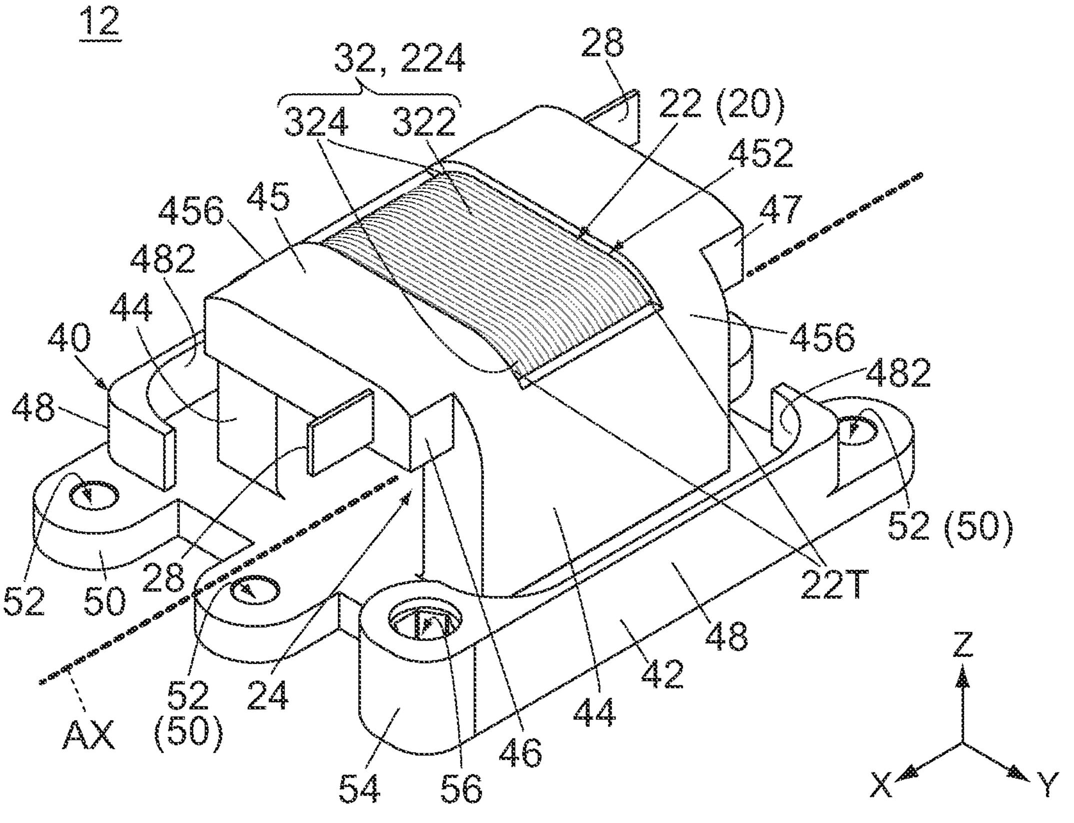
FIG. 6 is a perspective view showing an intermediate structure of the reactor of FIG. 1 in which the magnetic core is not yet formed, wherein the nuts are not attached to the intermediate structure, and an imaginary center axis of the winding portion of the coil of the intermediate structure is illustrated with dashed line.

Referring to FIG. 6, the coil 20 forms an intermediate structure 12 together with the holding member 40 to which the fastening portions 50 are attached. In the intermediate structure 12, the coil 20 is held by the holding member 40. In detail, the holding member 40 is molded so that the holding member 40 covers the most part of the coil 20. The coil 20 is partially embedded in the holding member 40, and thereby the holding member 40 holds the coil 20.

Referring to FIG. 1 together with FIG. 6, the magnetic core 60 is fixed to the intermediate structure 12. The magnetic core 60 forms the reactor 10 together with the intermediate structure 12. The intermediate structure 12 has the same structure as that of the reactor 10 except for that the intermediate structure 12 does not comprise the magnetic core 60. Thus, the coil 20, the holding member 40 and the fastening portions 50 of the intermediate structure 12 have the same structures as those of the coil 20, the holding member 40 and the fastening portions 50 of the reactor 10, respectively.

Hereafter, explanation will be made about the coil 20 of the present embodiment.

Figure 11:
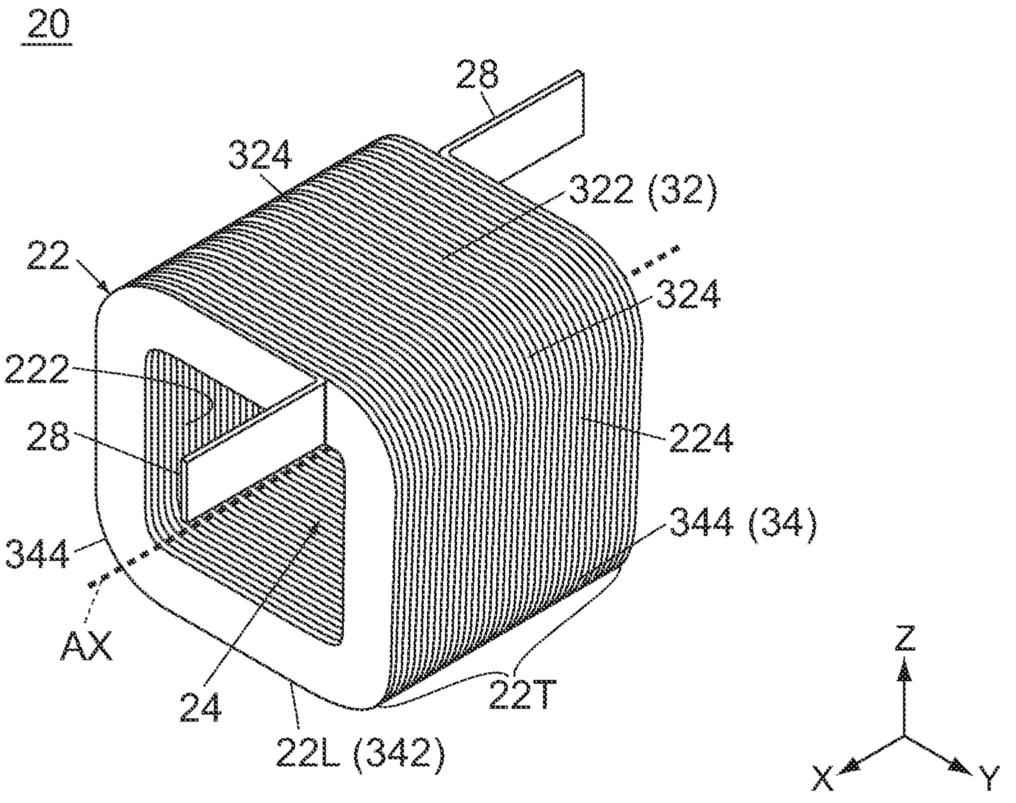
FIG. 11 is a perspective view showing the coil of the intermediate structure of FIG. 6, wherein the imaginary center axis of the winding portion is illustrated with dashed line.

Referring to FIG. 11, the coil 20 of the present embodiment is formed by winding a coated wire. The coated wire is formed of a conductive line made of metal which is covered by a thin insulative coat made of insulator. The coil 20 has a winding portion 22 and two terminals 28. The winding portion 22 is wound about a single center axis AX which extends along a front-rear direction (X-direction). The winding portion 22 is a collection of a plurality of turns 22T each of which is wound about the center axis AX by about one round. The two terminals 28 are connected to the turns 22T located at opposite ends of the winding portion 22 in the X-direction, respectively, while the conductive line thereof is exposed at each end.

The winding portion 22 of the present embodiment is formed by edgewise winding a flat coated wire. The winding portion 22 is wound so that the turns 22T thereof are in close contact with each other in the X-direction. Thus, the winding portion 22 of the present embodiment has a solenoid shape. By forming the winding portion 22 as described above, cross-sections of the turns 22T can be made large in a plane including the center axis AX. In addition, the winding number of the winding portion 22, i.e., the number of the turns 22T, can be made large. As a result, the reactor 10 suitable for large current can be obtained. However, the present invention is not limited thereto. For example, the winding portion 22 may be loosely wound so that the turns 22T are apart from each other in the X-direction. Moreover, the winding portion 22 may be formed by winding a round wire The winding portion 22 is formed with a center hole 24. The center hole 24 is a space which is enclosed by the winding portion 22 in a vertical plane (YZ-plane) perpendicular to the X-direction. The center hole 24 opens at opposite sides thereof in the X-direction. The center hole 24 of the present embodiment is completely enclosed in the YZ-plane by the winding portion 22 which has a solenoid shape. In detail, the winding portion 22 has an inner surface 222 and an outer surface 224 in the YZ-plane. The inner surface 222 faces the center hole 24 in the YZ-plane. The outer surface 224 defines the circumference of the winding portion 22 in the YZ-plane.

The winding portion 22 has a bottom surface 22L. The bottom surface 22L is a part of the outer surface 224 and is located at a lower end (negative Z-side end) of the winding portion 22 in an upper-lower direction (Z-direction) perpendicular to the X-direction. The winding portion 22 of the present embodiment has a rounded rectangular shape in the YZ-plane, and thereby the bottom surface 22L extends along a horizontal plane (XY-plane) perpendicular to the Z-direction. The winding portion 22 of the present embodiment has the aforementioned shape. However, the shape of the winding portion 22 of the present invention is not limited to the present embodiment. For example, the winding portion 22 may have a track shape in the YZ-plane.

As shown in FIG. 11, one of the two terminals 28 of the present embodiment is connected to the turn 22T located at a front end (positive X-side end) of the winding portion 22 and extends forward, or in the positive X-direction. A remaining one of the two terminals 28 of the present embodiment is connected to the turn 22T located at a rear end (negative X-side end) of the winding portion 22 and extends rearward, or in the negative X-direction. Each of the terminals 28 of the present embodiment is a part of the single coil 20 and a member formed integrally with the winding portion 22. However, the present invention is not limited thereto. For example, each of the terminals 28 may be a member formed separately from the winding portion 22 and may be connected to the winding portion 22 via welding, etc.

Figure 7:
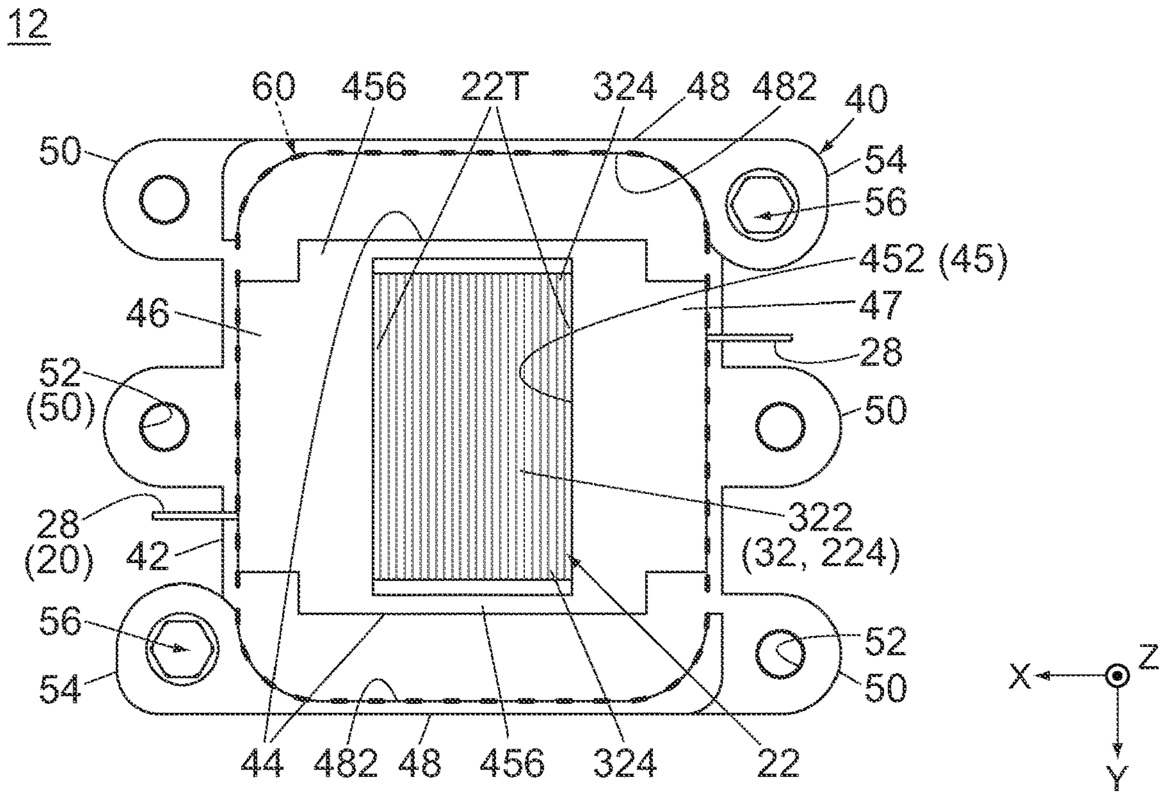
FIG. 7 is a top view showing the intermediate structure of FIG. 6, wherein an outline of an external surface of the magnetic core formed thereafter is illustrated with dashed line.
Figure 8:
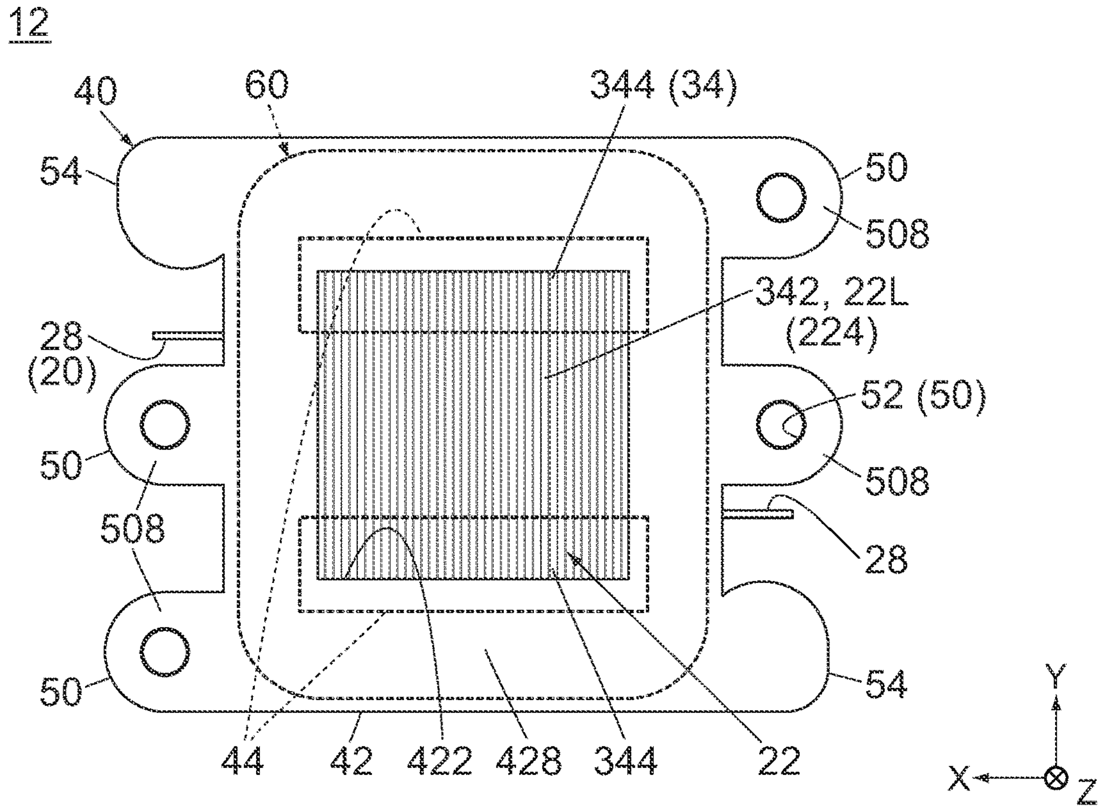
FIG. 8 is a bottom view showing the intermediate structure of FIG. 6, wherein an outline of the hidden magnetic core formed thereafter is illustrated with dashed line.
Figure 9:
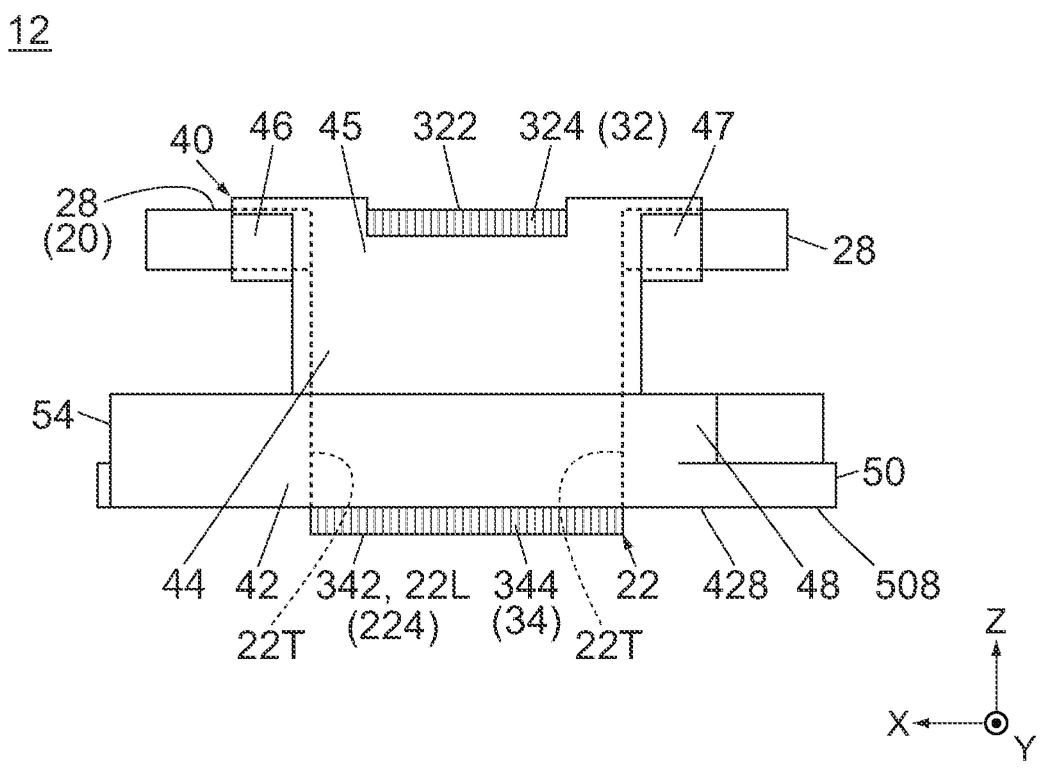
FIG. 9 is a side view showing the intermediate structure of FIG. 6, wherein a part of a hidden outline of the coil is illustrated with dashed line.
Figure 10:
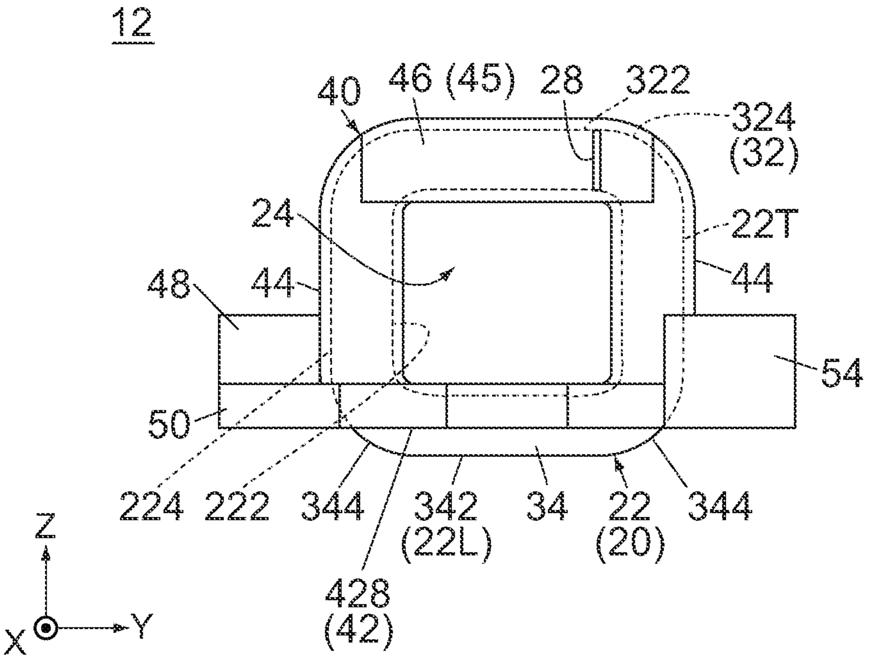
FIG. 10 is a front view showing the intermediate structure of FIG. 6, wherein a hidden rough shape of a turn of the coil is illustrated with dashed line.

As can be seen from FIGS. 6 to 10, the winding portion 22 is partially embedded in the holding member 40. In detail, referring to FIG. 10, the inner surface 222 of the winding portion 22 is completely covered by the holding member 40. Referring to FIGS. 6 and 10, the most part of the outer surface 224 of the winding portion 22 is covered by the holding member 40. Referring to FIGS. 9 and 10, the most part of a front surface (positive X-side surface) and a rear surface (negative X-side surface) of the winding portion 22 is also covered by the holding member 40.

Referring to FIG. 9, a connected portion between each of the terminals 28 and the turn 22T is covered by the holding member 40. In contrast, the end of each of the terminals 28 is exposed from the holding member 40. Thus, each of the terminals 28 extends outward of the holding member 40 from the winding portion 22. The terminals 28 extend along the X-direction while they are away from each other. However, in the present invention, the part of the winding portion 22 from which the terminal 28 extends and the shape of each of the terminals 28 are not specifically limited. For example, each of the terminals 28 may extend upward from an upper surface of the winding portion 22.

As described above, the most part of the winding portion 22 of the present embodiment is embedded in the holding member 40. According to this structure, the turns 22T of the winding portion 22 can be prevented from becoming loose. Moreover, the winding portion 22 has an upper exposed portion 32 and a lower exposed portion 34. The upper exposed portion 32 and the lower exposed portion 34 are traces of dies (not shown) which are used when the holding member 40 is molded. The upper exposed portion 32 and the lower exposed portion 34 are located at opposite sides of the winding portion 22 in the Z-direction, respectively. The upper exposed portion 32 is exposed upward, or in the positive Z-direction, from the holding member 40. The lower exposed portion 34 is exposed downward, or in the negative Z-direction, from the holding member 40. Thus, each of the upper exposed portion 32 and the lower exposed portion 34 is exposed from the holding member 40 in the Z-direction.

Referring to FIGS. 6, 7, 9 and 10, the upper exposed portion 32 of the present embodiment has one upper flat portion 322 and two upper curved portions 324. Each of the upper flat portion 322 and the upper curved portions 324 is a part of the outer surface 224 of the winding portion 22. In detail, the upper flat portion 322 and the upper curved portions 324 form an upper surface (positive Z-side surface) of the upper exposed portion 32. Thus, each of the upper flat portion 322 and the upper curved portions 324 is a part of the upper surface of the winding portion 22.

The upper flat portion 322 extends along the XY-plane. The upper curved portions 324 are located at opposite sides of the upper flat portion 322, respectively, in a lateral direction (Y-direction) perpendicular to both the X-direction and the Z-direction. The upper curved portions 324 are connected to opposite edge of the upper flat portion 322 in the Y-direction, respectively. Each of the upper curved portions 324 extends outward in the Y-direction and downward in an arc. Thus, each of the upper curved portions 324 has an arc shape in the YZ-plane and is exposed outward from the holding member 40 in the Y-direction.

Referring to FIGS. 8 to 10, the lower exposed portion 34 of the present embodiment has one lower flat portion 342 and two lower curved portions 344. Each of the lower flat portion 342 and the lower curved portions 344 is a part of the outer surface 224 of the winding portion 22. In detail, the lower flat portion 342 and the lower curved portions 344 form a lower surface (negative Z-side surface) of the lower exposed portion 34. Thus, each of the lower flat portion 342 and the lower curved portions 344 is a part of the lower surface of the winding portion 22.

The lower flat portion 342 of the present embodiment is the bottom surface 22L of the winding portion 22 and extends along the XY-plane. The lower curved portions 344 are located at opposite sides of the lower flat portion 342 in the Y-direction, respectively. The lower curved portions 344 are connected to opposite edges of the lower flat portion 342 in the Y-direction, respectively. Each of the lower curved portions 344 extends outward in the Y-direction and upward in an arc. Thus, each of the lower curved portions 344 has an arc shape in the YZ-plane and is exposed outward from the holding member 40 in the Y-direction.

Referring to FIG. 1, hereafter, explanation will be made about a part of the holding member 40 and the magnetic core 60 of the present embodiment and will be made about a forming method of the holding member 40 of the present embodiment.

Referring to FIGS. 6 and 7, the holding member 40 of the present embodiment has two sidewalls 44. Referring to FIGS. 6 and 10, each of the sidewalls 44 has a flat-plate shape extending in parallel to the XZ-plane. The sidewalls 44 are apart from each other in the Y-direction and extend in parallel to each other along the XZ-plane.

Figure 12:
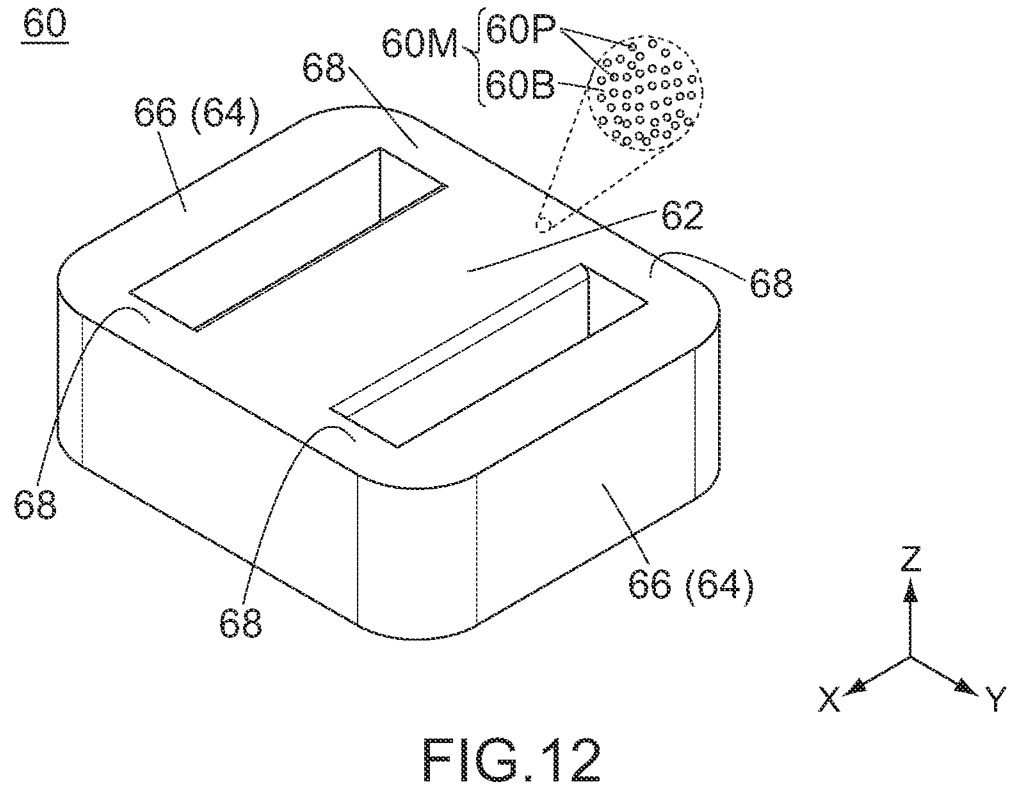
FIG. 12 is a perspective view showing the magnetic core of the reactor of FIG. 1, wherein a part of the magnetic core is enlarged so that a structure of composite magnetic material is schematically illustrated.

Referring to FIG. 12, the magnetic core 60 of the present embodiment is a gapless core made of only composite magnetic material 60M. Thus, the magnetic core 60 seamlessly and continuously extends in the XY-plane. The composite magnetic material 60M contains a binder 60B made of insulator such as thermosetting resin and magnetic particles 60P distributed in the binder 60B. The magnetic particles 60P are made of soft magnetic material. The magnetic particles 60P are bound together by the binder 60B and are insulated from each other. The composite magnetic material 60M may contain another material such as non-magnetic fillers in addition to the binder 60B and the magnetic particles 60P. The gapless core made of the composite magnetic material 60M as described above is hardly damaged and is suitable for the reactor 10 (see FIG. 1) which is used under a high vibration environment.

Figure 13:
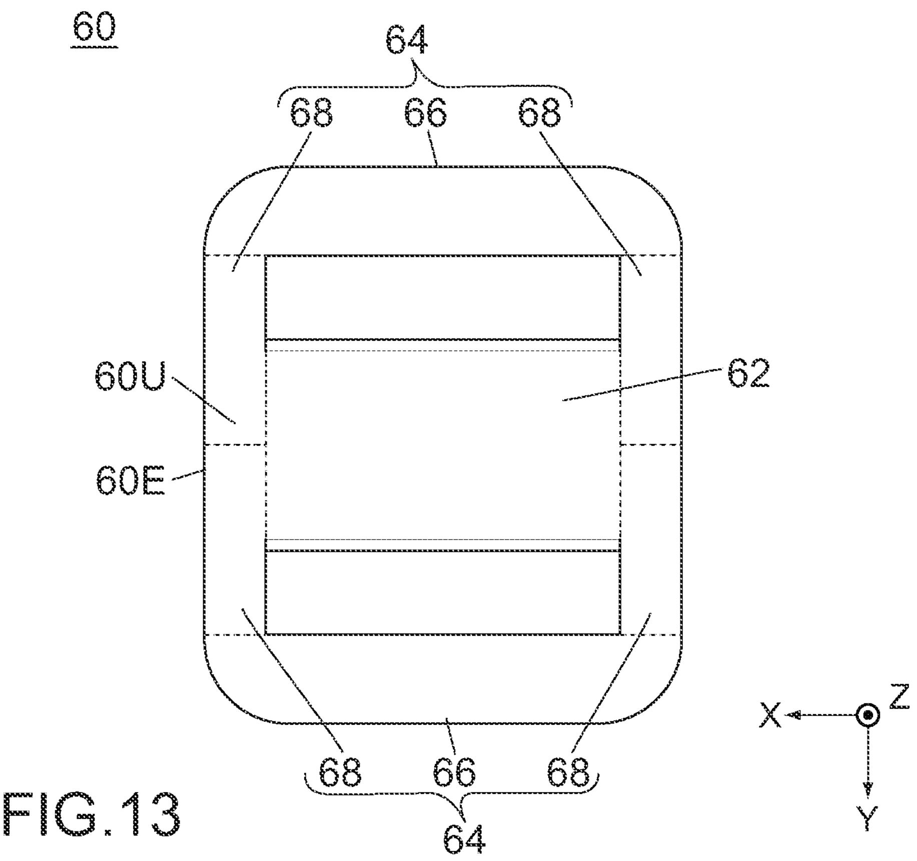
FIG. 13 is a top view showing the magnetic core of FIG. 12, wherein imaginary boundaries between portions of the magnetic core are illustrated with dashed line.

Referring to FIGS. 12 and 13, the magnetic core 60 has a middle leg 62 and two outer portions 64. Each of the outer portions 64 has an outer leg 66 and two coupling portions 68. For each of the outer portions 64, the coupling portions 68 couple opposite ends of the outer leg 66 in the X-direction to opposite ends of the middle leg 62 in the X-direction, respectively. In the present embodiment, these parts continuously extend with no gap formed therebetween. The magnetic core 60 has an upper surface 60U, a lower surface 60L and an external surface 60E. Each of the upper surface 60U and the lower surface 60L of the present embodiment is a smooth surface which is parallel to the XY-plane and continuously extends over all parts of the magnetic core 60. The external surface 60E defines the circumference of the magnetic core 60 in the XY-plane. The external surface 60E of the present embodiment is a closed curved surface extending in parallel to the Z-direction.

Figure 3:
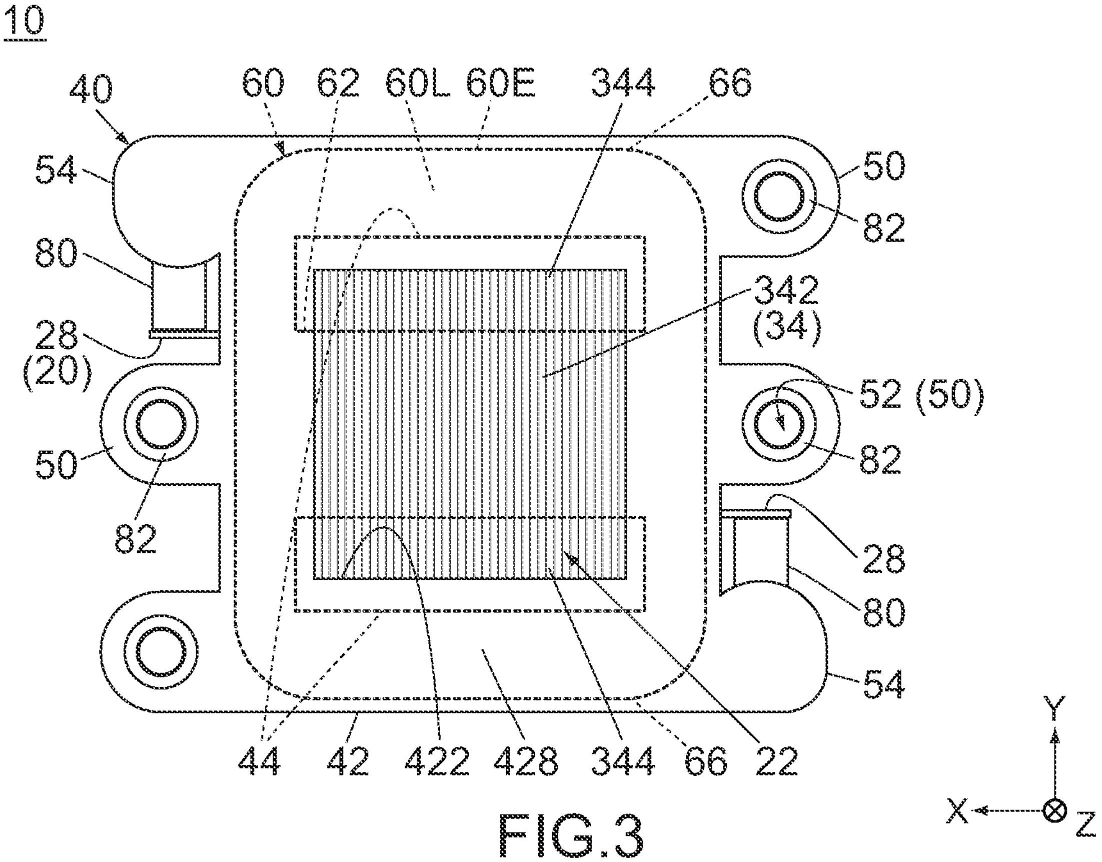
FIG. 3 is a bottom view showing the reactor of FIG. 1, wherein an outline of a hidden magnetic core is illustrated with dashed line.

Referring to FIG. 3 together with FIG. 6, the middle leg 62 of the magnetic core 60 is located in the center hole 24. Thus, the middle leg 62 of the magnetic core 60 is enclosed by the winding portion 22 in the YZ-plane. The winding portion 22 is located between the two outer legs 66 in the Y-direction. The two sidewalls 44 of the holding member 40 are provided so that they correspond to the outer legs 66, respectively. Thus, the holding member 40 has the two sidewalls 44 which correspond to the outer legs 66, respectively. Each of the sidewalls 44 is located between the corresponding outer leg 66 and the winding portion 22 in the Y-direction.

Referring to FIG. 12, the magnetic core 60 of the present embodiment has the aforementioned structure and thereby has a shape like an EE-core in the XY-plane. Moreover, the magnetic core 60 of the present embodiment has a mirror-symmetric shape with respect to the XY-plane. However, the present invention is not limited thereto, but the structure of the magnetic core 60 can be variously modified, provided that the magnetic core 60 has a shape like an EE-core in the XY-plane. For example, each of the upper surface 60U and the lower surface 60L may be formed with projections and depressions.

Referring to FIG. 1 together with FIG. 6, the reactor 10 of the present embodiment is made by forming the magnetic core 60 having a shape like an EE-core around the sidewalls 44 of the holding member 40. Thus, the reactor 10 of the present embodiment comprises the coil 20 having the single winding portion 22 and the magnetic core 60 having a shape like an EE-core. According to this structure, the magnetic path length can be made short, and the cross-section of the magnetic path can be made large in comparison with an existing reactor which is formed of a so-called eyeglass coil and a magnetic core having a shape like a UU-core. Thus, the inductance of the reactor 10 can be made large in comparison with that of the existing technique.

However, according to the reactor 10 described above, the outer portions 64 of the formed magnetic core 60 are arranged so that they face side surfaces of the winding portion 22 in the Y-direction no matter how the magnetic core 60 is formed. If the side surfaces of the winding portion 22 were exposed toward the outer portions 64 of the magnetic core 60, insulation properties between the side surface of the winding portion 22 and the outer portion 64 of the magnetic core 60 might be lowered under a condition where the insulative coat (not shown) of the side surface of the winding portion 22 was damaged, for example.

Therefore, the holding member 40 should completely cover the side surfaces of the winding portion 22 which face the magnetic core 60 and insulate them from the magnetic core 60. Thus, the holding member 40 should be molded so that the side surfaces of the winding portion 22 are buried in the holding member 40. However, when the holding member 40 is molded as described above, the coil 20 should be held so that it is unmovable in the XY-pale in addition to the Z-direction. More specifically, the side surfaces of the winding portion 22 should be pressed and held by a die (not shown). As a result of the holding by the die, traces of the die are inevitably formed on the sidewalls 44 of the holding member 40 in which the coil 20 is embedded. More specifically, the sidewalls 44 of the holding member 40 are formed with parts at each of which the side surface of the winding portion 22 is exposed toward the magnetic core 60.

As can be seen from the explanation described above, it is difficult to provide the magnetic core 60 having a shape like an EE-core in the reactor 10 comprising the coil 20 partially embedded in the holding member 40. However, according to the present embodiment, the holding member 40 in which the coil 20 is embedded has a new structure that has never existed before. According to this new structure, as described below, the holding member 40 can be molded of thermosetting material such as resin so that the winding portion 22 of the coil 20 is completely embedded in the holding member 40 except for the upper exposed portion 32 and the lower exposed portion 34.

Referring to FIGS. 9 and 10, when the holding member 40 is formed, first, the coil 20 (see FIG. 11) is made. Then, the winding portion 22 is arranged in dies (not shown), and the upper exposed portion 32 and the lower exposed portion 34 of the coil 20 are vertically sandwiched by the dies. For example, the lower exposed portion 34 is placed on a lower die (not shown). Then, the upper exposed portion 32 is pressed downward by an upper die (not shown), and thereby the lower exposed portion 34 is pressed against the lower die. Meanwhile, the upper curved portions 324 are sandwiched by opposite sides of the upper die in the Y-direction. The winding portion 22 can be positioned in the Z-direction and in the XY-plane by sandwiching the winding portion 22 by the dies as described above.

Then, a slide die (not shown) is inserted into the center hole 24 of the winding portion 22. Then, thermosetting material is poured into the inside of the dies. Then, the thermosetting material is solidified. Then the dies are detached. Then, the fastening portions 50 are attached to the solidified thermosetting material. As a result, the holding member 40 is formed. Thus, the intermediate structure 12 is made.

According to the present embodiment, the winding portion 22 can be held so that it is unmovable in the Z-direction and the XY-plane by sandwiching the winding portion 22 with the dies (not shown) as described above. Thus, the holding member of the present embodiment can be formed so that the winding portion 22 is partially embedded therein. However, the present invention is not limited thereto, but the forming method of the holding member 40 can be variously modified as necessary. For example, when the winding portion 22 is positioned, not only the upper curved portions 324 but also the lower curved portions 344 may be sandwiched by opposite sides of the lower die (not shown) in the Y-direction. In addition, a front surface and a rear surface of the lower exposed portion 34 may be sandwiched by opposite sides of the lower die in the X-direction. According to this method, the winding portion 22 can be more reliably positioned in the XY-plane.

Referring to FIG. 9, the structure of each of the upper exposed portion 32 and the lower exposed portion 34 can be variously modified, provided that the coil 20 can be positioned upon forming the holding member 40.

For example, the whole upper surface of the upper exposed portion 32 may have an arc shape which protrudes upward in the YZ-plane. Thus, the upper exposed portion 32 may have only one upper curved portion 324. The upper curved portion 324 may be exposed from the holding member 40 at opposite sides thereof in the Y-direction regardless of whether the upper exposed portion 32 has any shape. Similarly, the whole lower surface of the lower exposed portion 34 may have an arc shape which protrudes downward in the YZ-plane. Thus, the lower exposed portion 34 may have only one lower curved portion 344. Instead, the lower exposed portion 34 may have only the lower flat portion 342. In an instance where the lower curved portion 344 is provided, the lower curved portion 344 may be exposed from the holding member 40 at opposite sides thereof in the Y-direction regardless of whether the lower exposed portion 34 has any shape.

Referring to FIGS. 9 and 10, according to the present embodiment, an upper end (positive Z-side end) of the upper exposed portion 32 is located below an upper end of the holding member 40, and a lower end of the lower exposed portion 34 is located below a lower end of the holding member 40. Thus, a front surface and a rear surface of the upper exposed portion 32 are covered by the holding member 40, but a front surface and a rear surface of the lower exposed portion 34 are exposed from the holding member 40. However, the present invention is not limited thereto, but a positional relation of each of the upper exposed portion 32 and the lower exposed portion 34 relative to the holding member 40 can be variously modified as necessary.

Hereafter, explanation will be made about the holding member 40 and the fastening portions 50 of the present embodiment.

Referring to FIGS. 6 and 7, the holding member 40 of the present embodiment has a lower support portion 42, an upper support portion 45, two outer walls 48 and two connection portions 54 in addition to the two sidewalls 44. The holding member of the present embodiment has only the aforementioned portions. However, the present invention is not limited thereto. For example, the holding member 40 may further have another portion in addition to the aforementioned portions. Instead, each of the aforementioned portions may be provided as necessary.

Referring to FIGS. 6 and 10, each of the sidewalls 44 of the present embodiment is formed integrally with the holding member 40. In other words, each of the sidewalls 44 is a part of the holding member 40. More specifically, each of the sidewalls 44 is a middle part of the holding member 40 in the Z-direction. When the winding portion 22 is imaginary divided into four portions consisting of opposite portions in the Y-direction, a lower portion and an upper portion, the sidewalls 44 completely cover the opposite portions in the Y-direction of the winding portion 22, respectively, in the XY-plane. In detail, the inner surface 222 and the outer surface 224 of the opposite portions of the winding portion 22 in the Y-direction are completely covered by the two sidewalls 44. In addition, a front end and a rear end of the opposite portions of the winding portion 22 in the Y-direction are completely covered by the two sidewalls 44.

Each of the sidewalls 44 of the present embodiment has the aforementioned structure. However, the structure of each of the sidewalls 44 is not specifically limited, provided that the sidewalls 44 cover and insulate the opposite portions of the winding portion 22 in the Y-direction.

Referring to FIGS. 6 and 8 to 10, the lower support portion 42 of the present embodiment is formed integrally with the holding member 40. In other words, the lower support portion 42 is a part of the holding member 40. More specifically, the lower support portion 42 is a lower part (negative Z-side part) of the holding member 40. The lower support portion 42 has a flat-plate shape extending in parallel to the XY-plane. Referring to FIGS. 6, 9 and 10, each of the sidewalls 44 extends upward from the lower support portion 42. Thus, the lower support portion 42 supports the sidewalls 44.

Referring to FIGS. 8 to 10, the lower support portion 42 partially covers the lower portion of the winding portion 22 in the XY-plane. In detail, the inner surface 222 of the lower portion of the winding portion 22 is completely covered by the lower support portion 42. The outer surface 224, a front end and a rear end of the lower portion of the winding portion 22 are partially covered by the lower support portion 42.

More specifically, referring to FIG. 8, the lower support portion 42 is formed with a lower opening 422. The lower opening 422 is a space which opens downward. The lower opening 422 is located at the middle of the lower support portion 42 in the XY-plane and is surrounded by a lower surface 428 of the lower support portion 42. The lower exposed portion 34, which is the lower portion of the winding portion 22, projects downward and is exposed from the lower opening 422. In detail, referring to FIGS. 9 and 10, the lower exposed portion 34 projects downward beyond the lower surface 428 of the lower support portion 42.

The lower support portion 42 of the present embodiment has the aforementioned structure. However, the structure of the lower support portion 42 is not specifically limited, provided that the lower support portion 42 covers and insulates the inner surface 222 of the lower portion of the winding portion 22 while allowing the lower exposed portion 34 to be exposed downward.

Referring to FIGS. 6, 7, 9 and 10, the upper support portion 45 of the present embodiment is formed integrally with the holding member 40. In other words, the upper support portion 45 is a part of the holding member 40. More specifically, the upper support portion 45 is an upper part (positive Z-side part) of the holding member Referring to FIGS. 6, 9 and 10, each of the sidewalls 44 vertically extends between the lower support portion 42 and the upper support portion 45. Thus, the upper support portion 45 is supported by the sidewalls 44.

Referring to FIGS. 6 and 7, the upper support portion 45 has a flat-plate shape extending in parallel to the XY-plane as a whole. The upper support portion 45 has an upper front support portion 46 and an upper rear support portion 47. Thus, the holding member 40 of the present embodiment has the upper front support portion 46 and the upper rear support portion 47. The upper front support portion 46 is a part of the upper support portion 45 which partially protrudes forward. The upper rear support portion 47 is another part of the upper support portion 45 which partially protrudes rearward. The upper front support portion 46 is located forward of the winding portion 22. The upper rear support portion 47 is located rearward of the winding portion 22. Each of the upper front support portion 46 and the upper rear support portion 47 faces a part of the lower support portion 42 in the Z-direction.

The upper support portion 45 of the present embodiment has two upper sidewalls 456 which correspond to the sidewalls 44, respectively, in addition to the upper front support portion 46 and the upper rear support portion 47. Each of the upper sidewalls 456 is a part of the upper support portion 45 which partially protrudes outward in the Y-direction. Each of the upper sidewalls 456 is connected to an upper end of the corresponding sidewall 44.

Referring to FIGS. 7, 9 and 10, the upper support portion 45 partially covers the upper portion of the winding portion 22 in the XY-plane. In detail, the inner surface 222, the front end and the rear end of the upper portion of the winding portion 22 are completely covered by the upper support portion 45. The outer surface 224 of the upper portion of the winding portion 22 is partially covered by the upper support portion 45.

More specifically, referring to FIGS. 6 and 7, the upper support portion 45 is formed with an upper opening 452. The upper opening 452 is a space which opens upward. The upper opening 452 is located at the middle of the upper support portion 45 in the XY-plane. Referring to FIGS. 6 and 9, the upper exposed portion 32, which is a part of the upper portion of the winding portion 22, is located in the upper opening 452 and is exposed from the upper support portion 45.

The upper support portion 45 of the present embodiment has the aforementioned structure. However, the present invention is not limited thereto. The structure of the upper support portion 45 is not specifically limited, provided that the upper support portion 45 covers and insulates the inner surface 222 of the upper portion of the winding portion 22 while allowing the upper exposed portion 32 to be exposed upward and outward at opposite sides thereof in the Y-direction.

Referring to FIGS. 6, 7 and 9, each of the outer walls 48 of the present embodiment is formed integrally with the holding member 40. In other words, each of the outer walls 48 is a part of the holding member 40. The outer walls 48 are provided on the lower support portion 42 so that they correspond to the sidewalls 44, respectively.

Referring to FIGS. 6 and 7, the outer walls 48 are located at opposite sides of the lower support portion 42 in the Y-direction, respectively. Each of the outer walls 48 extends upward from the lower support portion 42 while partially enclosing the corresponding sidewall 44 in the XY-plane. In detail, each of the outer walls 48 has an inner surface 482 in the XY-plane. Each of the inner surfaces 482 has a middle part in the X-direction which linearly extends along the X-direction. Each of the inner surfaces 482 has opposite ends in the X-direction which extend inward in the Y-direction in an arc. A groove is formed between each of the inner surfaces 482 and the corresponding sidewall 44.

Each of the outer walls 48 of the present embodiment has the aforementioned structure. However, the present invention is not limited thereto. For example, each of the outer walls 48 may be formed separately from the lower support portion 42 and thereafter may be attached and fixed to the lower support portion 42. Moreover, each of the outer walls 48 may be provided as necessary.

Referring to FIG. 1, each of the connection portions 54 of the present embodiment is a part for fixing a busbar 80 made of conductor such as metal to the holding member 40. Referring to FIGS. 6 and 7, each of the connection portions 54 of the present embodiment is formed integrally with the holding member 40. In other words, each of the connection portions 54 is a part of the holding member 40. The connection portions 54 of the present embodiment are provided so that they correspond to the outer walls 48, respectively. One of the connection portions 54 protrudes forward from the corresponding outer wall 48. A remaining one of the connection portions 54 protrudes rearward from the corresponding outer wall 48. Each of the connection portions 54 is formed with a connection hole 56. Each of the connection holes 56 is a hole which is recessed downward and has a bottom. Each of the connection holes 56 opens upward.

Each of the connection portions 54 of the present embodiment has the aforementioned structure. However, the present invention is not limited thereto. For example, the arrangement of the connection portions 54 is not specifically limited. Moreover, each of the connection portions 54 may be provided as necessary.

Referring to FIG. 1, each of the fastening portions 50 of the present embodiment is a part for fixing the reactor 10 on an object (not shown) such as a circuit board. Referring to FIGS. 6 and 7, the holding member 40 of the present embodiment is provided with four of the fastening portions 50 for fastening the reactor on the object. However, the present invention is not limited thereto. For example, the number of the fastening portions 50 may be three or less or may be five or more. Moreover, the fastening portions 50 may be provided as necessary.

Referring to FIGS. 6 and 7, the fastening portions 50 of the present embodiment are located outward of the winding portion 22 in the X-direction. In detail, two of the fastening portions 50 protrude forward from the lower support portion 42. Remaining two of the fastening portions 50 protrude rearward from the lower support portion 42. Referring to FIGS. 8 and 9, a lower surface 508 of each of the fastening portions 50 is located at a position same as that of the lower surface 428 of the lower support portion 42 in the Z-direction and continuously extends from the lower surface 428. Thus, each of the lower surfaces 508 of the fastening portions 50 is flush with the lower surface 428 of the lower support portion 42. Referring to FIGS. 6 to 8, each of the fastening portions 50 is formed with a fastening hole 52. Each of the fastening holes 52 passes through the fastening portion 50 in the Z-direction.

Referring to FIG. 6, in the present embodiment, the parts of the holding member 40 such as the lower support portion 42, the sidewalls 44, the upper support portion 45, the outer walls 48 and the connection portions 54 are formed integrally with each other. However, according to the present embodiment, two of the fastening portions 50 are located just under a slide path of a slide die (not shown). It is difficult to mold the thus-arranged fastening portions 50 simultaneously with the holding member 40. Accordingly, each of the fastening portions 50 of the present embodiment is attached to the lower support portion 42 after the parts of the holding member 40 are formed integrally with each other.

In general, in a case where additional portions such as the fastening portions cannot be simultaneously molded with the holding member 40, the reactor 10 (see FIG. 1) excluding the additional portions is made, and then another molding for forming the additional portions is performed. In contrast, according to the present embodiment, after the holding member 40 has been formed, each of the pre-manufactured fastening portions 50 is attached to the lower support portion 42. According to this manufacturing method, each of the fastening portions 50 can be arranged outward of the lower support portion 42 in the X-direction with no increase of another molding step. Thus, according to the present embodiment, manufacturing cost of the reactor can be reduced. However, the present invention is not limited thereto. For example, each of the fastening portions 50 may be arranged outward of the lower support portion 42 in the Y-direction. According to this arrangement, the fastening portions 50 can be simultaneously and integrally formed with the holding member 40, and thereby manufacturing cost of the reactor 10 can be further reduced.

Hereafter, explanation will be made about a forming method of the magnetic core 60 (see FIG. 12) of the present embodiment.

Referring to FIGS. 1 and 6 together with FIG. 12, the magnetic core 60 of the present embodiment is formed by injecting magnetic slurry made of the composite magnetic material 60M onto the intermediate structure 12. Referring to FIG. 6 together with FIG. 1, the magnetic core 60 of the present embodiment is injection-molded so that it is filled in the center hole 24 of the intermediate structure 12 and encloses each of the sidewalls 44 of the intermediate structure 12 in the XY-plane. Thus, the reactor 10 of the present embodiment comprises the intermediate structure 12 and the injection-molded magnetic core 60.

If the coil 20, in particular the winding portion 22, is exposed at a part to which the magnetic slurry is injected, the winding portion 22 might be directly covered by the magnetic slurry. Thus, the winding portion 22 might not be insulated from the formed magnetic core 60.

However, according to the present embodiment, each of the sidewalls 44 of the holding member 40 is located between the winding portion 22 and the magnetic core 60 in the Y-direction and insulates the winding portion 22 from the magnetic core 60. In detail, a part of the winding portion 22 which is located above the lower support portion 42 is completely covered and insulated by the holding member 40 except for the upper exposed portion 32. The upper exposed portion 32 is a blind spot when seen from the position where the magnetic slurry is injected. In addition, a part of the winding portion 22 which is located below the lower support portion 42 is covered and hidden by the lower support portion 42 in the Z-direction. Therefore, the magnetic core 60 having a shape like an EE-core can be provided in the reactor 10 comprising the coil 20 partially embedded in the holding member 40.

According to the present embodiment, when the magnetic core 60 is injection-molded, the winding portion 22 is not brought into contact with the magnetic slurry. However, the forming method of the magnetic core 60 is not limited to that of the present embodiment. For example, the magnetic core 60 may be a casting core.

As described above, the reactor 10 of the present embodiment can be made of the coil 20 having the single winding portion 22 and the magnetic core 60 having a shape like an EE-core. Thus, the present embodiment can provide the reactor 10 which comprises the coil 20 partially embedded in the holding member 40 and has a relatively large inductance.

Referring to FIG. 12, as previously described, the magnetic core 60 of the present embodiment is made of only the composite magnetic material 60M. However, the present invention is not limited thereto. For example, the magnetic core 60 may include a dust core (not shown) made of soft magnetic material in addition to the part made of the composite magnetic material 60M. Thus, the magnetic core 60 may be, at least in part, made of the composite magnetic material 60M. For example, the part made of the composite magnetic material 60M may be formed so that a plurality of small pieces of dust cores are buried therein. When the magnetic core 60 includes the dust cores, the inductance of the reactor 10 (see FIG. 1) can be made large.

The magnetic core 60 may be formed of only a dust core. For example, instead of the injection molding, a plurality of dust cores may be fixed to each other by an adhesive so that the magnetic core 60 is formed. Thus, the magnetic core 60 may be an assembly in which a plurality of dust cores are joined together. When the magnetic core 60 is formed of only dust cores, the inductance of the reactor 10 (see FIG. 1) can be made even larger.

Referring to FIGS. 1 and 6, each of the sidewalls 44 of the present embodiment is formed with no hole which opens toward both the winding portion 22 and the outer leg 66. According to this structure, the winding portion 22 can be more reliably insulated from the magnetic core 60. However, the present invention is not limited thereto. For example, each of the sidewalls 44 may be formed with a hole which does not substantially affect insulation.

The upper exposed portion 32 of the present embodiment is visible when the reactor 10 is seen along the Y-direction. However, the present invention is not limited thereto. For example, referring to FIGS. 4 and 5, the upper sidewalls 456 may be located outward of the whole upper exposed portion 32 in the Y-direction while being apart from the upper curved portions 324 of the upper exposed portion 32 in the Y-direction. In other words, the upper exposed portion 32 may be seamlessly enclosed by the holding member 40 in the XY-plane. According to this modification, the winding portion 22 can be more reliably insulated from the magnetic core 60.

Figure 4:
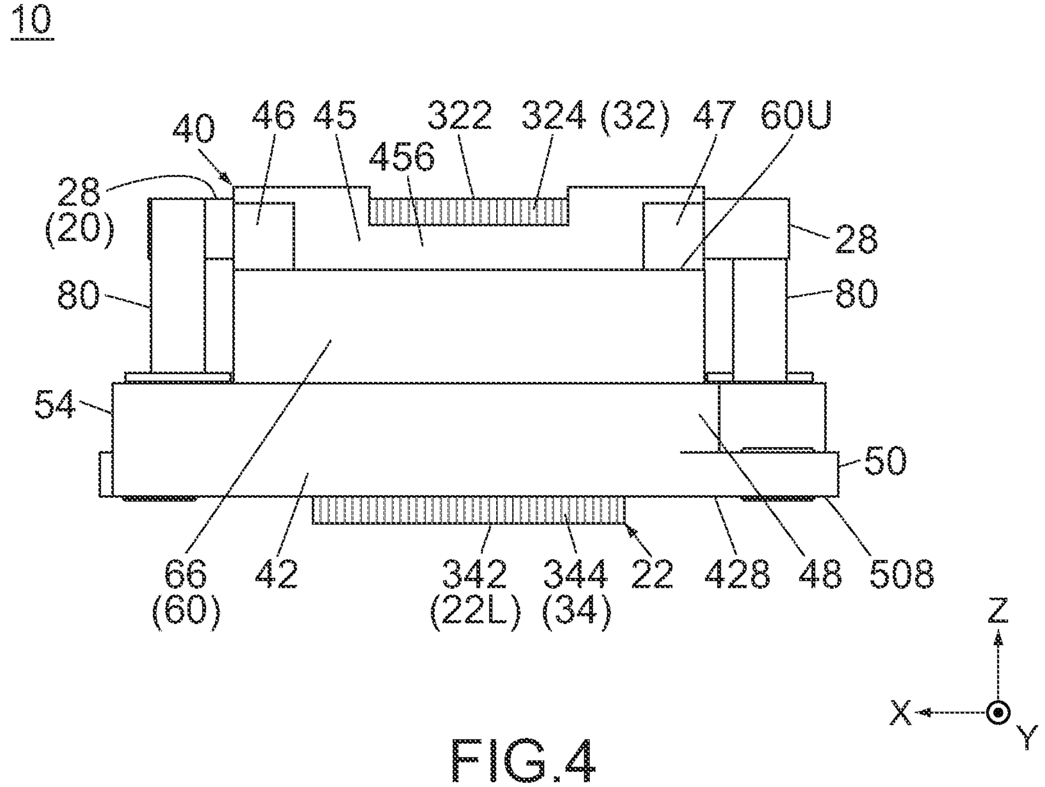
FIG. 4 is a side view showing the reactor of FIG. 1.

Referring to FIG. 4, the magnetic core 60 of the present embodiment is located between the upper exposed portion 32 and the lower exposed portion 34 of the winding portion 22 in the Z-direction. Thus, the magnetic core 60 of the present embodiment is arranged so that the position of the magnetic core 60 in the Z-direction does not overlap with the position of the upper exposed portion 32 and the lower exposed portion 34 in the Z-direction. According to this arrangement, the winding portion 22 can be more reliably insulated from the magnetic core 60. However, the present invention is not limited thereto. For example, in an instance where the upper exposed portion 32 is seamlessly enclosed by the holding member 40 in the XY-plane, the position of the magnetic core 60 in the Z-direction may overlap with the position of the upper exposed portion 32 in the Z-direction.

Figure 2:
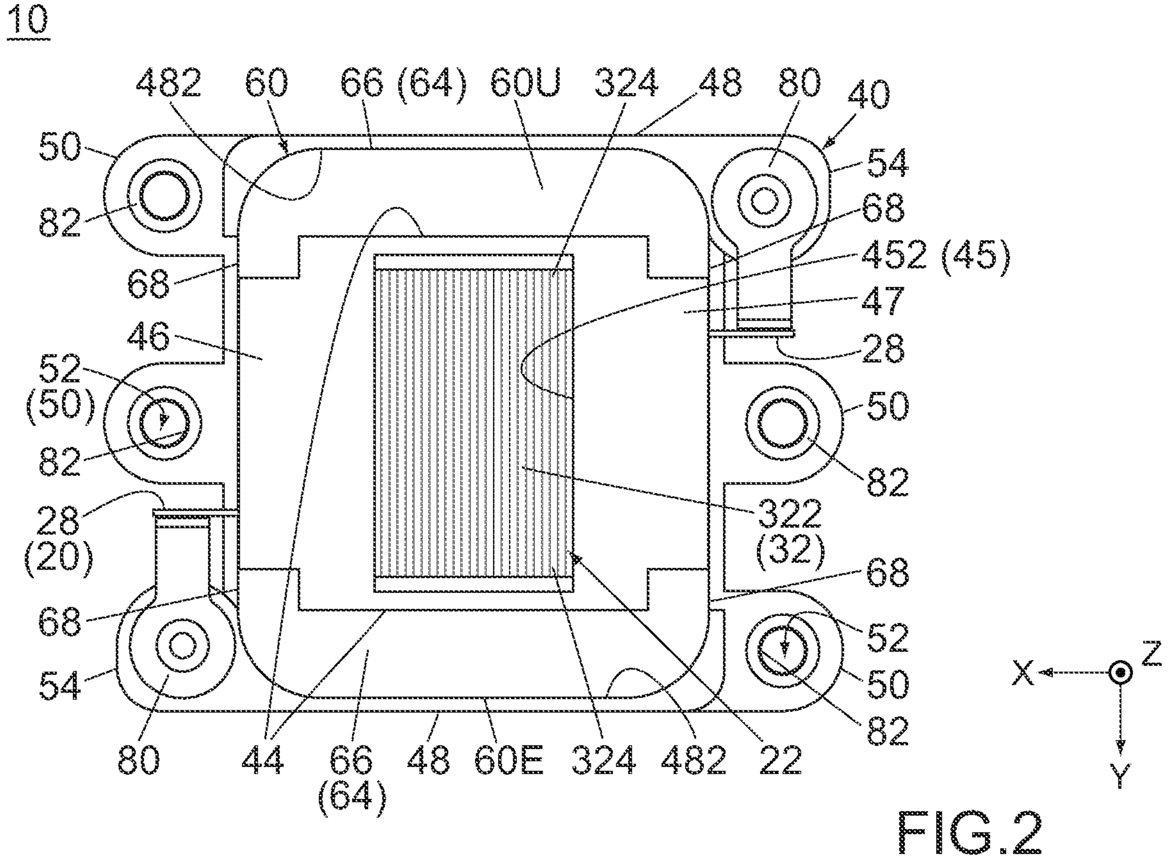
FIG. 2 is a top view showing the reactor of FIG. 1.
Figure 5:
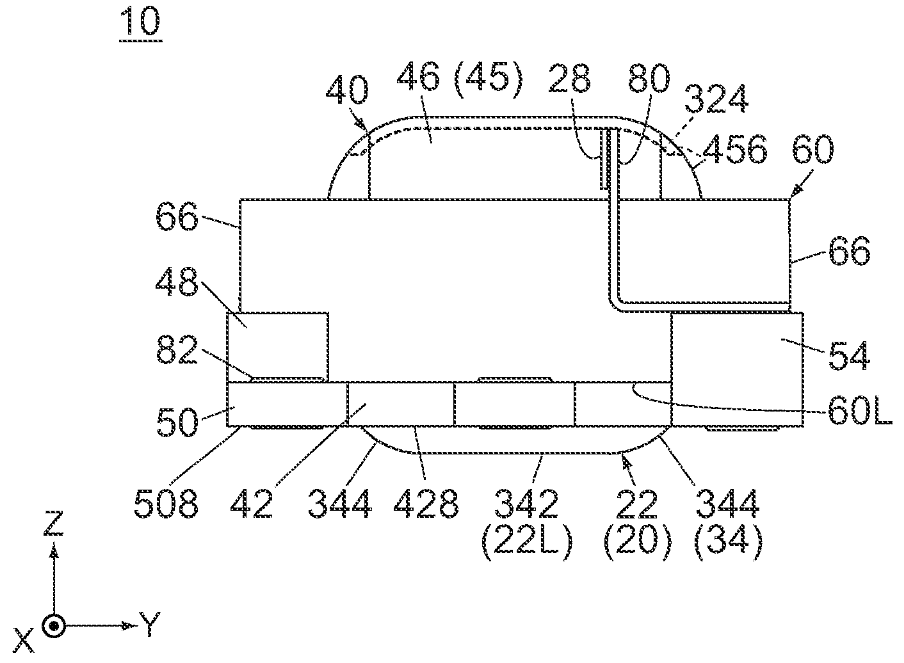
FIG. 5 is a front view showing the reactor of FIG. 1, wherein a part of a hidden outline of a winding portion of a coil and a part of a hidden outline of a holding member are illustrated with dashed line.

Referring to FIG. 1, the lower support portion 42, the upper front support portion 46, the upper rear support portion 47 and the outer walls 48 of the holding member 40 of the present embodiment are provided as described below. Referring to FIG. 5, the lower support portion 42 is in contact with the lower surface 60L of the magnetic core 60 and supports the lower surface 60L. Referring to FIGS. 1 and 4, each of the upper front support portion 46 and the upper rear support portion 47 is in contact with the upper surface 60U of the magnetic core 60. Referring to FIG. 2, each of the outer walls 48 is in contact with the external surface 60E of the magnetic core in the XY-plane. In detail, the inner surface 482 of each of the outer walls 48 is in contact with the external surface 60E of the magnetic core 60 in the XY-plane. Since the lower support portion 42, the upper front support portion 46, the upper rear support portion 47 and the outer walls 48 of the present embodiment are provided as described above, the magnetic core 60 can be injection-molded in an area defined by the lower support portion 42, the upper front support portion 46, the upper rear support portion 47 and the outer walls 48.

The magnetic core 60 of the present embodiment is sandwiched between the lower support portion 42 and each of the upper front support portion 46 and the upper rear support portion 47 in the Z-direction and is sandwiched between the inner surfaces 482 in each of the X-direction and the Y-direction. Thus, the magnetic core 60 of the present embodiment is securely positioned so that it is unmovable in the Z-direction and in the XY-plane. According to this structure, variation of the inductance, which might be caused due to positional displacement of the magnetic core 60, can be prevented, and damage of the magnetic core 60 can be prevented. However, the present invention is not limited thereto. For example, the upper front support portion 46, the upper rear support portion 47 and the outer walls 48 may be provided as necessary.

Hereafter, explanation will be made about the reactor 10 of the present embodiment.

Referring to FIG. 1, the reactor 10 of the present embodiment is fixed on an object (not shown) such as a circuit board when used. At that time, four nuts 82 are attached to the fastening holes 52 of the four fastening portions 50 of the reactor 10, respectively. Each of the nuts 82 may be press-fit into the fastening hole 52 or may be insert-molded in the fastening portion 50 when the fastening portion 50 is molded. Then, screws (not shown) are screwed into the nuts 82, respectively, so that the fastening portions 50 are fixed to the object.

The reactor 10 of the present embodiment is connected to a power source (not shown) via the two busbars 80 after fixed on the object (not shown). At that time, two nuts 84 are attached to the connection holes 56 of the two connection portions 54, respectively. Each of the nuts 84 may be press-fit into the connection hole 56 or may be insert-molded in the connection portion 54 when the holding member 40 is molded. Then, upper ends of the busbars 80 are fixed and connected to the terminals 28 of the coil 20, respectively, via welding, etc. Then, screws (not shown) are screwed into the nuts 84, respectively, through passing holes (not shown) of lower ends of the busbars and passing holes (not shown) of conductive members (not shown) each made of conductor, and thereby the busbars 80 are fixed and connected to the two conductive members, respectively. As a result, large current flows from the power source to the coil 20 through the conductive members when the reactor 10 is used.

Since the magnetic core 60 of the present embodiment is formed of the composite magnetic material 60M (see FIG. 12), it is hardly magnetically saturated even under a condition where large current flows through the coil 20. Therefore, the reactor 10 of the present embodiment can be reduced in size while its magnetic properties are maintained. Thus, according to the present embodiment, the reactor 10 which is small and is suitable for large current can be obtained.

In general, the reactor 10 comprising the magnetic core 60 made of only the composite magnetic material 60M (see FIG. 12) has an initial inductance lower than that of a reactor comprising a dust core, wherein the initial inductance is an inductance under a condition where relatively small current of about 30 to 40 A flows through the coil 20. Therefore, current should be supplied for a relatively long time so that required boost performance is obtained. Core loss increases as the current flows. However, the magnetic core 60 of the present embodiment is formed of low loss material as described below, and thereby core loss can be reduced.

The magnetic particles 60P (see FIG. 12) of the composite magnetic material (see FIG. 12) contained in the magnetic core 60 of the present embodiment are alloy powder represented by composition formula of $Fe_{X1}B_{X2}Si_{X3}P_{X4}C_{X5}Cu_{X6}Cr_{X7}$ except for inevitable impurities, wherein $X1+X2+X3+X4+X5+X6+X7=100$ at %, $79 \le X1 \le 86$ at %, $4 \le X2 \le 13$ at %, $0 \le X3 \le 8$ at %, $1 \le X4 \le 14$ at %, $0 \le X5 \le 5$ at %, $0.4 \le X6 \le 1.4$ at % and $0 \le X7 \le 3$ at %. According to this composition, core loss of the magnetic core 60 can be reduced. However, the present invention is not limited thereto, but the composition of the magnetic particles 60P may be designed in consideration of various magnetic properties required for the reactor 10.

The magnetic particles 60P (see FIG. 12) may be the alloy powder in which a part of Fe of the aforementioned composition formula is replaced with one or more elements selected from a group consisting of Co, Ni, V, Nb, Zr, Hf, Mo, Ta, W, Ag, Au, Pd, K, Ca, Mg, Sn, Zn, Ti, Al, Mn, S, O, N, Y and rare-earth elements. In this instance, the one or more elements selected from the group consisting of Co, Ni, V, Nb, Zr, Hf, Mo, Ta, W, Ag, Au, Pd, K, Ca, Mg, Sn, Zn, Ti, Al, Mn, S, O, N, Y and rare-earth elements is 3 at % or less relative to the whole composition. The combined total of Fe and the one or more elements selected from the group consisting of Co, Ni, V, Nb, Zr, Hf, Mo, Ta, W, Ag, Au, Pd, K, Ca, Mg, Sn, Zn, Ti, Al, Mn, S, O, N, Y and rare-earth elements is X1 at %.

From a viewpoint of further reduction of core loss of the magnetic core 60, the alloy powder which has the aforementioned composition is preferred to contain nanocrystals of αFe. The nanocrystals are preferred to have substantially spherical shapes. When the nanocrystals are approximated into perfect spheres, an average diameter (D50) of the nanocrystals is preferred to be not less than 5 nm but not more than 50 nm.

Referring to FIG. 4, when current flows through the winding portion 22 of the reactor 10 in use, heat is generated in the winding portion 22 and the magnetic core 60. If the generated heat is accumulated, the reactor 10 might not work as designed. Moreover, the reactor 10 might be damaged. However, the bottom surface 22L of the winding portion 22 of the present embodiment is located below the holding member 40. According to this arrangement, when the reactor 10 is fixed on an object (not shown) such as a circuit board, the bottom surface 22L can be in contact with the object so that heat is discharged. Thus, the bottom surface 22L of the present embodiment works as a heat sink. In addition, referring to FIG. 1, the upper exposed portion 32 of the present embodiment works as another heat sink which radiates heat into the air. However, the present invention is not limited thereto. For example, the position of the bottom surface 22L of the winding portion 22 in the Z-direction can be modified as necessary.

Referring to FIG. 2, the reactor 10 of the present embodiment has a 180-degree rotationally symmetric shape when seen from above along the Z-direction. A shape of the reactor 10 which is rotated by 180 degrees about an axis extending in parallel to the Z-direction is same as another shape thereof before this rotation except for tolerance. According to this structure, two components same as each other can be used as the two busbars 80, and thereby manufacturing cost of the reactor 10 can be reduced. In addition, strength design of the reactor 10 is easy.

The reactor 10 of the present embodiment has a 180-degree rotationally symmetric shape including the upper exposed portion 32 of the winding portion 22. In detail, each of the turns 22T exposed upward extends straight along the Y-direction. However, the present invention is not limited thereto. For example, each of the turns 22T may be slightly oblique to the Y-direction. Thus, the reactor 10 may substantially have a 180-degree rotationally symmetric shape when seen from above along the Z-direction.

The reactor 10 of the present embodiment can be further variously modified in addition to the already described modifications. Hereafter, explanation will be made about two modifications of the reactor 10.

Figure 14:
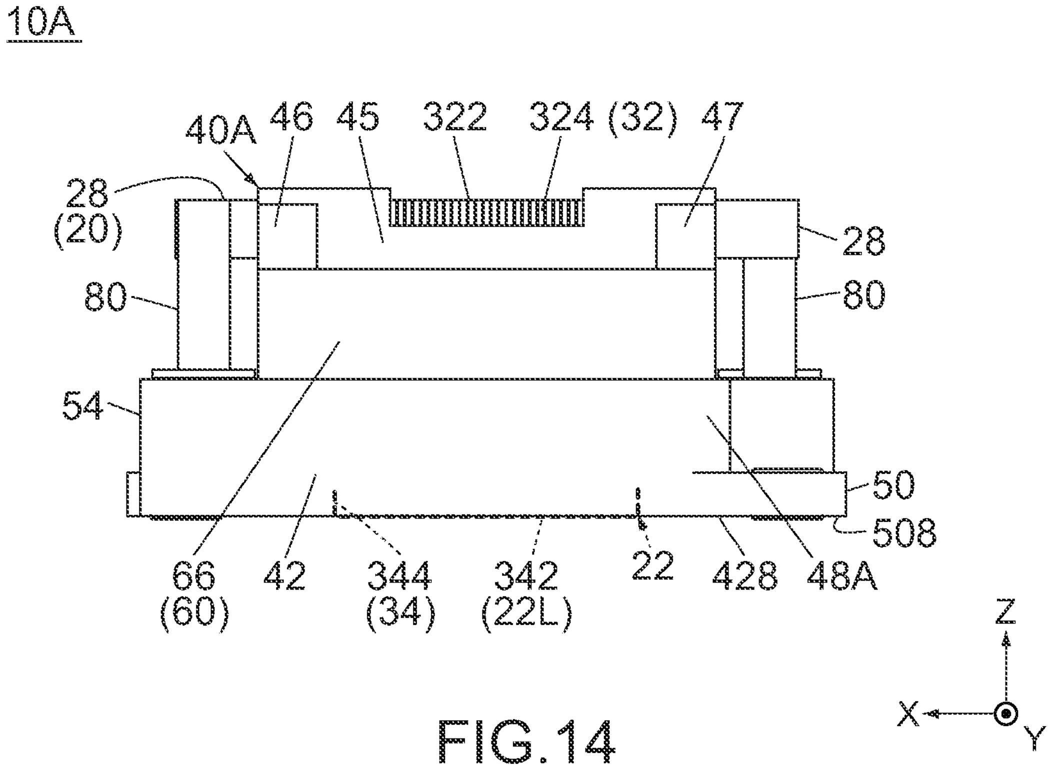
FIG. 14 is a side view showing a modification of the reactor of FIG. 1, wherein a part of a hidden outline of the winding portion of the coil is illustrated with dashed line.
Figure 15:
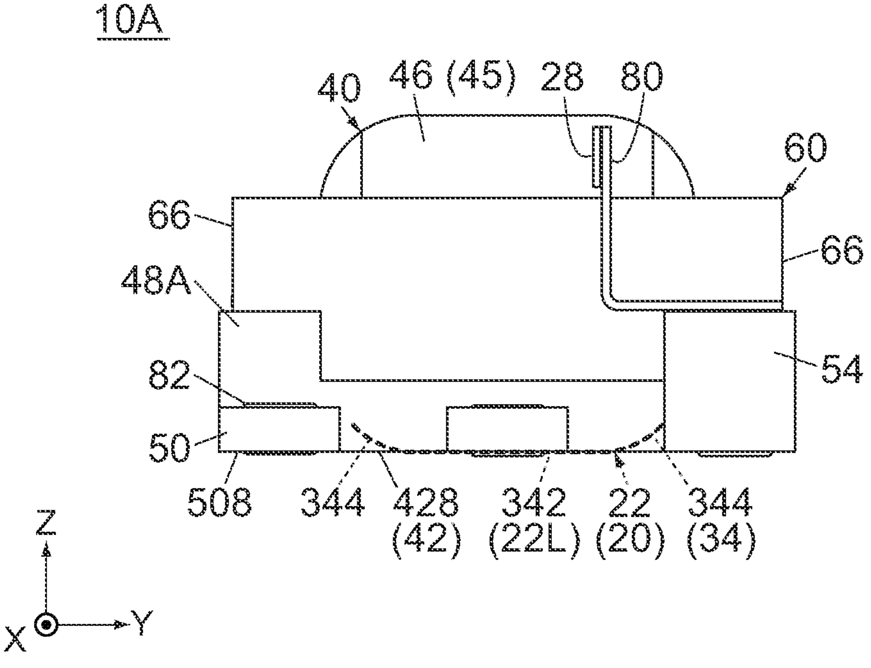
FIG. 15 is a front view showing the reactor of FIG. 14, wherein a part of a hidden outline of the winding portion of the coil is illustrated with dashed line.

Comparing FIGS. 14 and 15 with FIGS. 4 and 5, a reactor 10A according to a first modification comprises the coil 20, the magnetic core 60 and the fastening portions 50 same as those of the reactor 10 but comprises a holding member 40A different from the holding member 40 of the reactor 10. The lower support portion 42 of the holding member 40A is located at a lower position in comparison with the lower support portion 42 of the holding member 40. The holding member 40A has outer walls 48A which extend longer in the Z-direction in comparison with the outer walls 48 of the holding member 40. The holding member 40A has the same structure as the holding member 40 except for these differences.

According to the present modification, the lower surfaces 508 of the fastening portions 50 can be flush with the bottom surface 22L of the winding portion 22. Thus, a lower surface of the whole lower support portion 42 including the lower surfaces 508 of the fastening portions 50 can be flush with the bottom surface 22L of the winding portion 22. According to the present modification, the height of the reactor 10A can be easily controlled during manufacture of the reactor 10A, and thereby manufacturing cost of the reactor 10A can be reduced.

Figure 16:
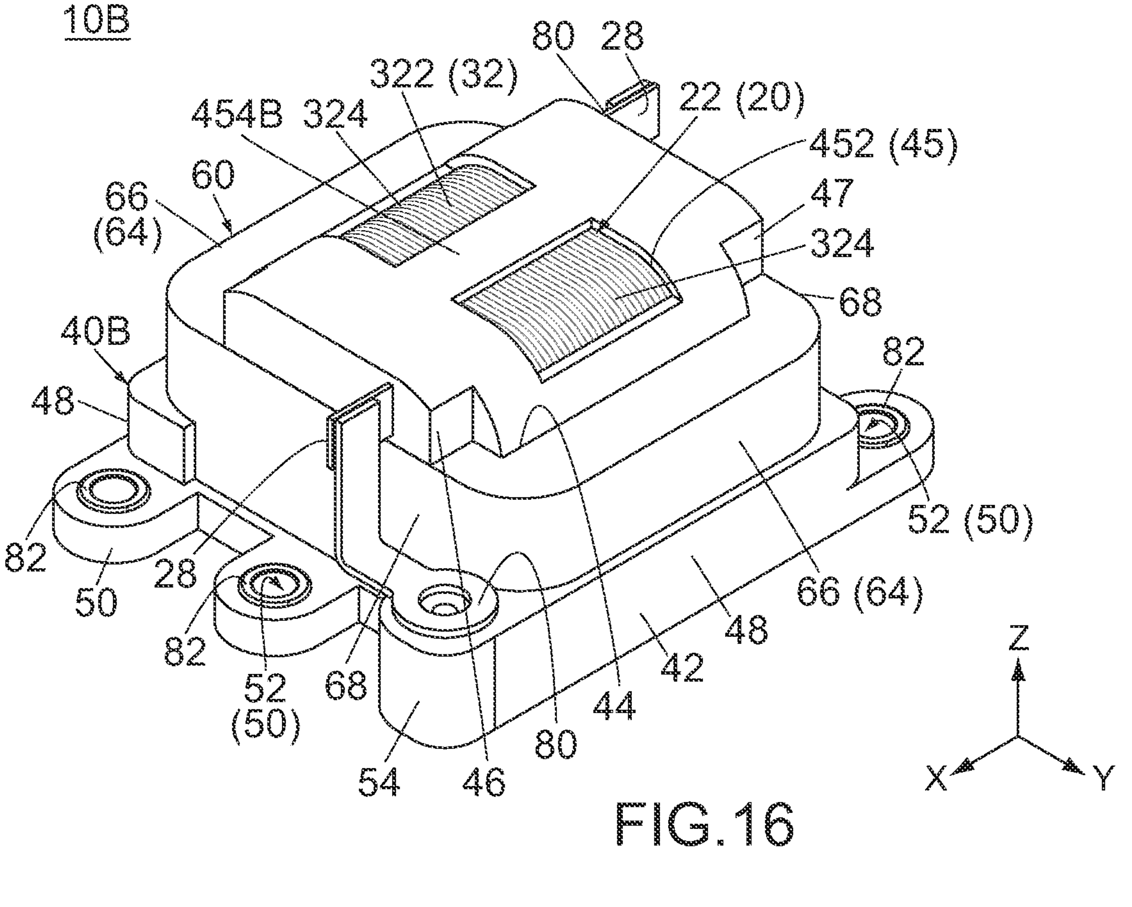
FIG. 16 is a perspective view showing another modification of the reactor of FIG. 1.

Comparing FIG. 16 with FIG. 1, a reactor 10B according to a second modification comprises the coil 20, the magnetic core 60 and the fastening portions 50 same as those of the reactor 10 but comprises a holding member 40B different from the holding member 40 of the reactor 10. The holding member 40B has an upper wall 454B which the holding member 40 does not have. The upper wall 454B is provided so that it partially covers the upper opening 452 of the upper support portion 45. In detail, the upper wall 454B extends along the X-direction through the whole upper opening 452 while covering a middle part of the upper flat portion 322 of the winding portion 22 in the Y-direction. The holding member 40B has the same structure as the holding member 40 except for these differences.

According to the present modification, the upper exposed portion 32 of the winding portion 22 can be partially covered while the holding member 40B can be molded, and thereby insulation properties of the winding portion 22 can be made even higher.

The present application is based on a Japanese patent application of JP2020-177981 filed before the Japan Patent Office on Oct. 23, 2020, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST

10,10A,10B reactor
12 intermediate structure
20 coil
22 winding portion
22L bottom surface
22T turn
222 inner surface
224 outer surface
24 center hole
28 terminal
32 upper exposed portion
322 upper flat portion

324 upper curved portion
34 lower exposed portion
342 lower flat portion
344 lower curved portion
40,40A,40B holding member
42 lower support portion
422 lower opening
428 lower surface
44 sidewall
45 upper support portion
452 upper opening
454B upper wall
456 upper sidewall
46 upper front support portion
47 upper rear support portion
48,48A outer wall
482 inner surface
fastening portion
508 lower surface
52 fastening hole
54 connection portion
56 connection hole
60 magnetic core
60U upper surface
60L lower surface
60E external surface
60M composite magnetic material
60B binder
60P magnetic particle
62 middle leg
64 outer portion
66 outer leg
68 coupling portion
AX center axis
80 busbar
82,84 nut

The invention claimed is:

1. A reactor comprising a coil, a holding member and a magnetic core, wherein:

the coil has a winding portion;

the winding portion is wound about a single center axis which extends along a front-rear direction;

the winding portion has an upper exposed portion and a lower exposed portion;

the upper exposed portion and the lower exposed portion are located at opposite sides, respectively, in an upper-lower direction perpendicular to the front-rear direction;

the winding portion is partially embedded in the holding member;

each of the upper exposed portion and the lower exposed portion is exposed from the holding member in the upper-lower direction;

the upper exposed portion has an upper curved portion;

the upper curved portion is exposed from the holding member at opposite sides thereof in a lateral direction perpendicular to both the front-rear direction and the upper-lower direction;

the magnetic core has a middle leg and two outer portions;

each of the outer portions has an outer leg and two coupling portions;

the middle leg is enclosed by the winding portion in a vertical plane perpendicular to the front-rear direction;

the winding portion is located between the two outer legs in the lateral direction;

for each of the outer portions, the coupling portions couple opposite ends of the outer leg in the front-rear direction to opposite ends of the middle leg in the front-rear direction, respectively;

the holding member has two sidewalls which correspond to the outer legs, respectively; and each of the sidewalls is located between a corresponding one of the outer legs and the winding portion in the lateral direction.

2. The reactor as recited in claim 1, wherein:

the magnetic core is a gapless core and is, at least in part, made of composite magnetic material; and the composite magnetic material contains a binder and magnetic particles distributed in the binder.

3. The reactor as recited in claim 2, wherein the magnetic core is made of only the composite magnetic material.

4. The reactor as recited in claim 1, wherein each of the sidewalls is formed with no hole which opens toward both the winding portion and the outer leg.

5. The reactor as recited in claim 1, wherein:

the lower exposed portion has a lower curved portion; and the lower curved portion is exposed from the holding member at opposite sides thereof in the lateral direction.

6. The reactor as recited in claim 5, wherein:

the upper exposed portion has an upper flat portion and two of the upper curved portions;

the upper curved portions are located at opposite sides of the upper flat portion in the lateral direction, respectively;

the lower exposed portion has a lower flat portion and two of the lower curved portions; and the lower curved portions are located at opposite sides of the lower flat portion in the lateral direction, respectively.

7. The reactor as recited in claim 1, wherein the magnetic core is located between the upper exposed portion and the lower exposed portion in the upper-lower direction.

8. The reactor as recited in claim 1, wherein:

the holding member has a lower support portion, an upper front support portion and an upper rear support portion;

the lower support portion supports a lower surface of the magnetic core;

the upper front support portion is located forward of the winding portion and is in contact with an upper surface of the magnetic core; and the upper rear support portion is located rearward of the winding portion and is in contact with the upper surface of the magnetic core.

9. The reactor as recited in claim 8, wherein:

the holding member is provided with a fastening portion for fastening the reactor on an object;

the lower support portion is integrally formed with the holding member; and the fastening portion is attached to the lower support portion.

10. The reactor as recited in claim 9, wherein a lower surface of the fastening portion is flush with a bottom surface of the winding portion.

11. The reactor as recited in claim 1, wherein:

the holding member has an outer wall; and the outer wall is in contact with an external surface of the magnetic core in a horizontal plane perpendicular to the upper-lower direction.

12. The reactor as recited in claim 2, wherein the magnetic particles of the composite magnetic material are alloy powder represented by a composition formula $Fe_{X1}B_{X2}Si_{X3}P_{X4}C_{X5}Cu_{X6}Cr_{X7}$ except for inevitable impurities, wherein $X1+X2+X3+X4+X5+X6+X7=100$ at %, $79 \leq X1 \leq 86$ at %, $4 \leq X2 \leq 13$ at %, $0 \leq X3 \leq 8$ at %, $1 \leq X4 \leq 14$ at %, $0 \leq X5 \leq 5$ at %, $0.4 \leq X6 \leq 1.4$ at % and $0 \leq X7 \leq 3$ at %.

13. The reactor as recited in claim 12, wherein the magnetic particles are the alloy powder in which a part of Fe is replaced with one or more elements selected from a group consisting of Co, Ni, V, Nb, Zr, Hf, Mo, Ta, W, Ag, Au, Pd, K, Ca, Mg, Sn, Zn, Ti, Al, Mn, S, O, N, Y and rare-earth elements;

the one or more elements selected from the group consisting of Co, Ni, V, Nb, Zr, Hf, Mo, Ta, W, Ag, Au, Pd, K, Ca, Mg, Sn, Zn, Ti, Al, Mn, S, O, N, Y and rare-earth elements is 3 at % or less relative to the whole composition; and the combined total of Fe and the one or more elements selected from the group consisting of Co, Ni, V, Nb, Zr, Hf, Mo, Ta, W, Ag, Au, Pd, K, Ca, Mg, Sn, Zn, Ti, Al, Mn, S, O, N, Y and rare-earth elements is X1 at %.

14. The reactor as recited in claim 12 or 13, wherein the alloy powder contains nanocrystals of αFe; and an average diameter (D50) of the nanocrystals is not less than 5 nm but not more than 50 nm.

15. The reactor as recited in claim 1, wherein the reactor has a 180-degree rotationally symmetric shape when seen from above along the upper-lower direction.

16. A reactor comprising a coil, a holding member and a magnetic core, wherein:

the coil has a winding portion;

the winding portion is wound about a single center axis which extends along a front-rear direction;

the winding portion is partially embedded in the holding member;

the magnetic core is a gapless core;

the magnetic core has a middle leg and two outer portions;

each of the outer portions has an outer leg and two coupling portions;

the middle leg is enclosed by the winding portion in a vertical plane perpendicular to the front-rear direction;

the winding portion is located between the two outer legs in a lateral direction perpendicular to the front-rear direction;

for each of the outer portions, the coupling portions couple opposite ends of the outer leg in the front-rear direction to opposite ends of the middle leg in the front-rear direction, respectively;

the holding member has an upper front support portion, an upper rear support portion and an outer wall;

the upper front support portion is located forward of the winding portion and is in contact with an upper surface of the magnetic core in an upper-lower direction perpendicular to both the front-rear direction and the lateral direction;

the upper rear support portion is located rearward of the winding portion and is in contact with the upper surface of the magnetic core;

the outer wall is in contact with an external surface of the magnetic core in a horizontal plane perpendicular to the upper-lower direction;

the holding member is provided with a fastening portion for fastening the reactor on an object; and the fastening portion is integrally formed with the holding member.

* * * * *